United States Patent
Gaston

(10) Patent No.: US 11,230,392 B2
(45) Date of Patent: Jan. 25, 2022

(54) APACHE HELICOPTER STABILIZER BEARING REPLACEMENT KIT

(71) Applicant: James D Gaston, Meridianville, AL (US)

(72) Inventor: James D Gaston, Meridianville, AL (US)

( * ) Notice: Subject to any disclaimer, the term of this patent is extended or adjusted under 35 U.S.C. 154(b) by 0 days.

(21) Appl. No.: 17/115,306

(22) Filed: Dec. 8, 2020

(65) Prior Publication Data

US 2021/0371131 A1 Dec. 2, 2021

Related U.S. Application Data

(60) Provisional application No. 62/945,947, filed on Dec. 10, 2019.

(51) Int. Cl.

| | |
|---|---|
| *B25B 27/00* | (2006.01) |
| *B64F 5/40* | (2017.01) |
| *B64C 27/26* | (2006.01) |
| *B25B 27/06* | (2006.01) |
| *B25B 27/14* | (2006.01) |
| *B64C 27/82* | (2006.01) |

(52) U.S. Cl.
CPC ............. *B64F 5/40* (2017.01); *B25B 27/062* (2013.01); *B25B 27/14* (2013.01); *B64C 27/26* (2013.01); *B64C 2027/8272* (2013.01)

(58) Field of Classification Search
CPC ..... B25B 27/00; B25B 27/023; B25B 27/143; B25B 27/30; B23P 11/00; B23P 11/027; B23P 19/00; B23P 19/10
See application file for complete search history.

(56) References Cited

U.S. PATENT DOCUMENTS

| | | | |
|---|---|---|---|
| 2,284,522 A | 7/1940 | Keen | |
| 2,625,997 A | 11/1946 | Doak | |
| 3,717,317 A | 2/1973 | Certain | |
| 5,597,138 A | 1/1997 | Arlton et al. | |
| 7,867,234 B2 | 1/2011 | Collazo | |
| 8,186,031 B2 | 5/2012 | Whitney et al. | |
| 8,689,420 B2* | 4/2014 | Barrios | B25B 27/023 29/257 |
| 9,651,093 B2* | 5/2017 | Robb, Jr. | F16C 43/02 |
| 2009/0304315 A1 | 12/2009 | Johnson | |
| 2011/0219617 A1 | 9/2011 | Barrios et al. | |
| 2016/0158925 A1 | 6/2016 | Robb | |
| 2016/0368134 A1* | 12/2016 | Hafenrichter | G01N 27/90 |

* cited by examiner

*Primary Examiner* — Lee D Wilson
(74) *Attorney, Agent, or Firm* — Cynthia R. Wright

(57) ABSTRACT

The invention herein comprises a kit and method that may be used to replace damaged and worn stabilizer bearings in both the Echo and Delta Apache helicopter. The kit includes a removal assembly that includes a bolt coupled to a cutting mechanism. Tightening of the bolt causes the cutting mechanism to cut the damaged and worn bearing from its housing. A staking mechanism is disclosed that allows the staking of a replacement bearing in the housing is provided. The staking assembly joins the replacement bearing to the housing so that it is tight. And, an installation assembly is disclosed that utilizes the bolt utilized in the cutting mechanism coupled to a hex nut.

10 Claims, 40 Drawing Sheets

Replacement Bearing 15

Replacement Bearing 15

APACHE HELICOPTER STABILIZER BEARING REPLACEMENT KIT

CROSS-REFERENCE TO RELATED APPLICATIONS

This application claims the benefit of priority to U.S. Provisional Application Ser. No. 62/945,947, filed on Dec. 10, 2020 by James D. Gaston, the inventor herein.

DISCLOSURE REGARDING PRIOR DISCLOSURES BY THE INVENTOR OR A JOINT INVENTOR

The inventor has not disclosed this invention prior to the filing of this non provisional application.

BACKGROUND OF THE INVENTION (1) Field of the Invention

The Apache helicopter is a crucial component of the U.S. Army air attack fleet. In order to keep the Apaches in the air, maintenance and repair of necessary systems and components must be performed at bases around the world and in the field during military operations. The invention disclosed herein is a maintenance and repair kit and process, or method of using said kit, for replacing worn or defective spherical bearings in the stabilizer of Apache helicopters. Disclosed herein is an embodiment for the Delta Apache helicopter and an embodiment for the Echo Apache helicopter. This kit allows maintenance of the Apache stabilizer in remote areas of military operations.

(2) Disclosure of the Prior Art

The Apache helicopter [also known as the Boeing AH-64 Apache] is not only an attack helicopter, its a flying tank designed designed to survive heavy attack and inflict massive damage. It can zero in on specific targets, day or night, even in terrible weather. The Apache is utilized by the United States Army and the following countries: Israel, the United Kingdom, the Netherlands, Saudi Arabia, Egypt, and India. The Apache has seen action in battle during operation Desert Storm, Operation Enduring Freedom, Operation Anaconda, Operation Iraqi Freedom, and Operation Inherent Resolve. The Apache is a close combat attack vehicle capable of carrying one or more 30 mm guns, hellfire anti-tank missiles, and unguided 70 mm rockets. The Apache helicopter is critical to military operations.

The Apache comprises an armored cabin that provides a platform for weapons; a main rotor that provides lift allowing the helicopter to fly, as well as the control that allows the helicopter to move laterally, make turns and change altitude; a tail rotor that pulls against the torque of the main rotor holding the Apache straight by preventing spinning of the cabin; and a means for landing the vehicle. The tail rotor is formed of a composite member that is expensive and time consuming to manufacture. The Apache tail rotor includes a stabilizer that assists with controlling the movement of the helicopter, including vertical motion. The tail rotor stabilizer is essential to safe operation of the Apache.

Since the introduction of the first Apache prototype more than 3,000,000 flight hours have been logged. This heavy workload has meant that maintenance units could not keep up with the Apache's unexpectedly high work load. In order to provide spare parts for combat operations, the U.S. Army has had to ground Apaches reducing their time in theater significantly. During the numerous foreign military operations in deserts, Apaches flying low to the ground have experienced wear and tear, and damage from sand striking the stabilizer. Over time, desert sand damages the bearings in the Apache reducing the functionality of the tail rotor requiring the aircraft to be grounded for maintenance. Currently, the stabilizer must be removed from the aircraft and replaced. This typically results in a lengthy downtime for an aircraft, reducing the number of attack aircraft available for missions. A method of repairing and maintaining the stabilizer is needed. This method should be less expensive than stabilizer replacement, be performed by a maintenance crew in an active war zone, and not effect the integrity of the Apache aircraft.

Hafenrichter et al. (US 2016/0368134 A1) discloses an apparatus for maintenance of aircraft structural elements, including a helicopter stabilizer. But, the apparatus does not disclose any method of repairing or replacing bearings.

Barrios et al. (US 2011/219617 A1) discloses a wheel stud installing and removing system. The device of Barrios et al. allows the removal and installation of damaged studs that have been press-fitted into a hub assembly. The device comprises a "C" shaped frame that may be fitted next to a wheel hub. The device includes a forcing screw that turns against the stud pushing the stud either into the hub or out of the hub. This device could not be used on the Apache helicopter because the Apache includes a single spherical ball bearing wherein the ball must be removed before the bearing lug can be removed and a new spherical ball bearing positioned into the bearing lug. The bearing is staked onto the bearing lug so that use of this device on the Apache stabilizer would damage the stabilizer severely.

Robb (US 2016/0158925 A1) discloses a spherical bearing replacement and installation tool that is used to service Bell 206 Jet Ranger and Bell OH-58 Kiowa Warrior helicopter swash plate assembly. The device of application 2016/0158925 A1 will not work on the Apace helicopter because the device spherical bearing used in the Bell 206 Jet Ranger and the Bell OH-58 Kiowa Warrior, which includes a spherical bearing with a threaded hole that is used to insert the removal tool, differs from the spherical bearing of the Apache, that lacks a threaded hole to insert the removal tool. Additionally, this device/method could not be utilized to install a new bearing on the Apache because the replacement spherical ball bearing does not have a threaded center hole.

BRIEF SUMMARY OF THE INVENTION

This kit and method comprises a spherical bearing removal assembly that allows a damaged helicopter or airplane bearing, including a stabilizer bearing, and its housing to be removed in the field or in a maintenance facility. First, the stabilizer containing the damaged bearing is removed from the aircraft by maintenance crew. Then the damaged bearing is removed from the stabilizer, a new bearing is staked into a housing and reinstalled. Alternately, the new bearing is installed and staked during the installation process. This kit and method provides all necessary components to remove the damaged bearing from the aircraft stabilizer, or other aircraft part, to stake and install a new replacement bearing. This kit and method can be utilized in the field by technicians with very little training. This kit reduces maintenance time, training of maintenance personnel, and allows bearing maintenance to be performed almost anywhere.

The kit and method may comprise a removal assembly with a cutting bolt opposite a hex nut. A user's tightening of the cutting bolt cuts the damaged bearing and removes the housing from the stabilizer. The kit may also includes a staking means that allows the quick and efficient staking of a new replacement bearing into the bearing housing prior to installation of the new bearing into the stabilizer. The staking tool allows for the creation of a "V" groove along the outer race of the replacement bearing so that a small amount of the housing material is displaced over the race chamber of the replacement bearing. Then the staked replacement bearing contained within its housing is installed into the stabilizer. The kit may include an installation assembly that allows a user to quickly install the new replacement bearing into the stabilizer. The installation assembly may additionally allow a user to stake the new bearing during the installation of the new bearing into the stabilizer. Upon completion of the installation method with the kit, the new bearing will be installed into the stabilizer, and the stabilizer will be ready to be re-installed onto the aircraft so that the aircraft will again be flight ready. he means to remove the damaged bearing, including the housing that contains it, from the Apache stabilizer in the field. Next, the kit provides a staking tool that provides the means to remove the damaged bearing from its housing. Alternately, the bearing may be staked during installation. A user then installs the replacement bearing into the housing.

This kit and process allows for the replacement of a damaged bearing in the Apache stabilizer to be replaced within a hour or so. The kit and process can be utilized in the field, including in areas where enemy are engaged reducing down time for the Apache and enhancing the war fighting capability of the Apache fleet. And, this kit and method may be utilized on any aircraft with bearings.

BRIEF DESCRIPTION OF THE DRAWINGS

The invention is described in detail below with reference to the appended drawings.

FIGS. 1 and 2 depict an Apache stabilizer with a damaged bearing. FIGS. 3 and 4 depict damage that may occur to the bearing during normal operation of the Apache.

FIGS. 5 through 19A show the Apache Helicopter Stabilizer Bearing Replacement Kit being utilized to replace a bearing on the Echo model of the Apache Helicopter.

FIG. 5 depicts a top view of the Echo model of the Apache helicopter cutting stack assembly wherein the cutting stack assembly is exploded.

FIG. 6 illustrates a mid-sectional view of the Echo Apache model cutting stack assembly positioned and ready to begin removal of the damaged bearing.

FIGS. 7, 8, 9, 10, and 11 depict an angled front view of the sequential assembly of the Echo cutting stack assembly components onto the stabilizer.

FIG. 12 illustrates a top view of the cutting stack assembly fully assembled onto the Echo Apache stabilizer.

FIG. 13 depicts a side view of the cutting bolt and cutting mechanism, while FIG. 14 depicts the cutting mechanism.

FIG. 15 shows a side, exterior view of the spacer cup. FIG. 16 depicts an exterior, side view of the inner bearing bushing, and FIG. 17 depicts an angled view of the thrust bearing and a flat washer.

FIG. 18 depicts a mid-sectional view of the thrust bearing spacer.

FIG. 19 depicts an exterior view of a damaged bearing. FIG. 19A a side view of the bearing, and 19A inner bearing bushing coupled thereto.

FIG. 20 illustrates a top view of the Apache Delta model with the Apache Helicopter Stabilizer Bearing Replacement Kit exploded.

Figure 21:
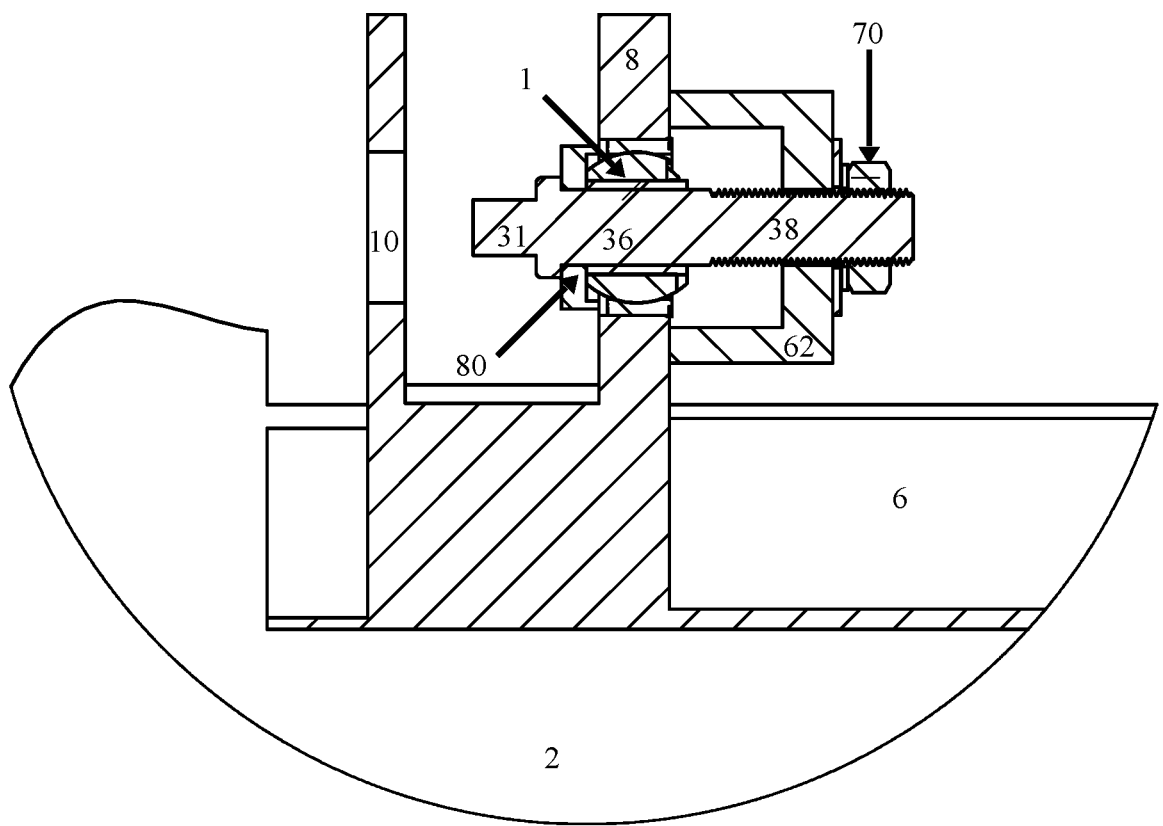

A mid-sectional view of the Apache Delta model with the Apache Helicopter Stabilizer Bearing Replacement Kit installed is shown in FIG. 21.

Figure 20:
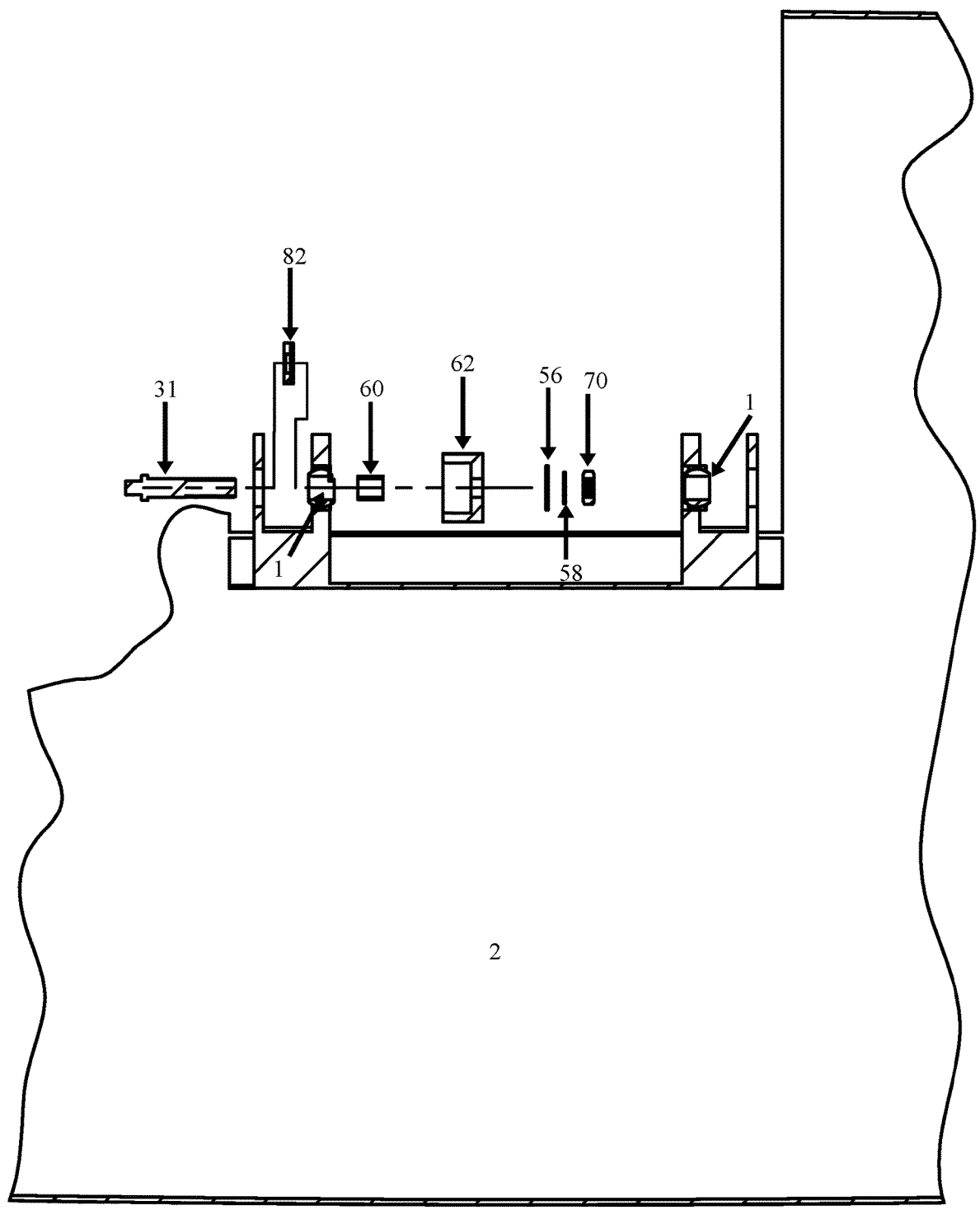
Figure 22:
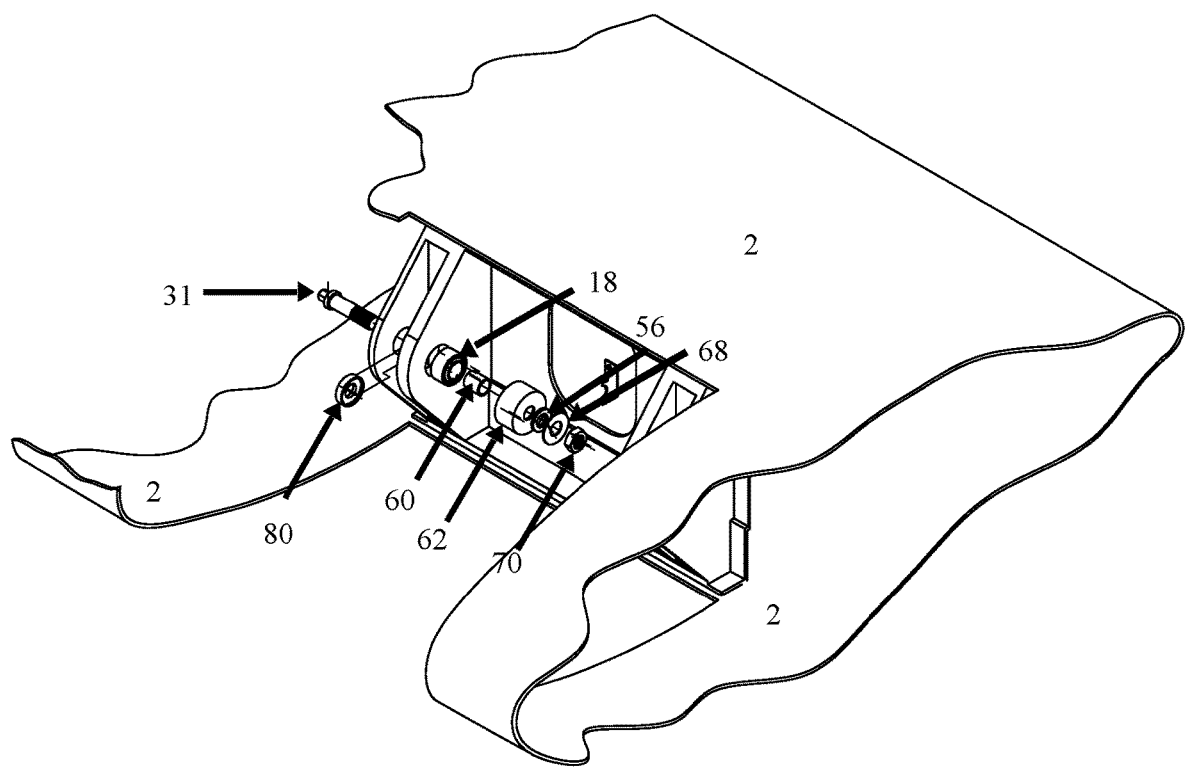
Figure 22A:
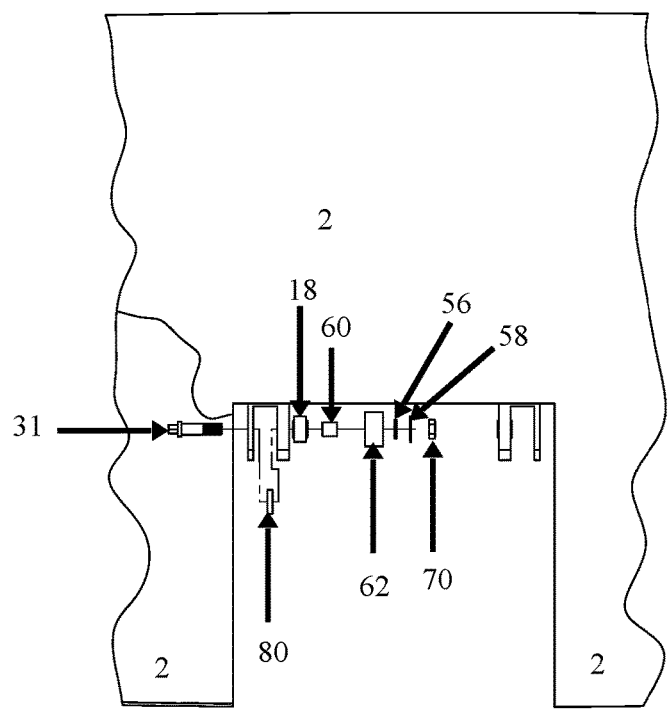

FIG. 22 illustrates an angled view of FIG. 20, and FIG. 22A is a top view of FIG. 22.

Figure 23:
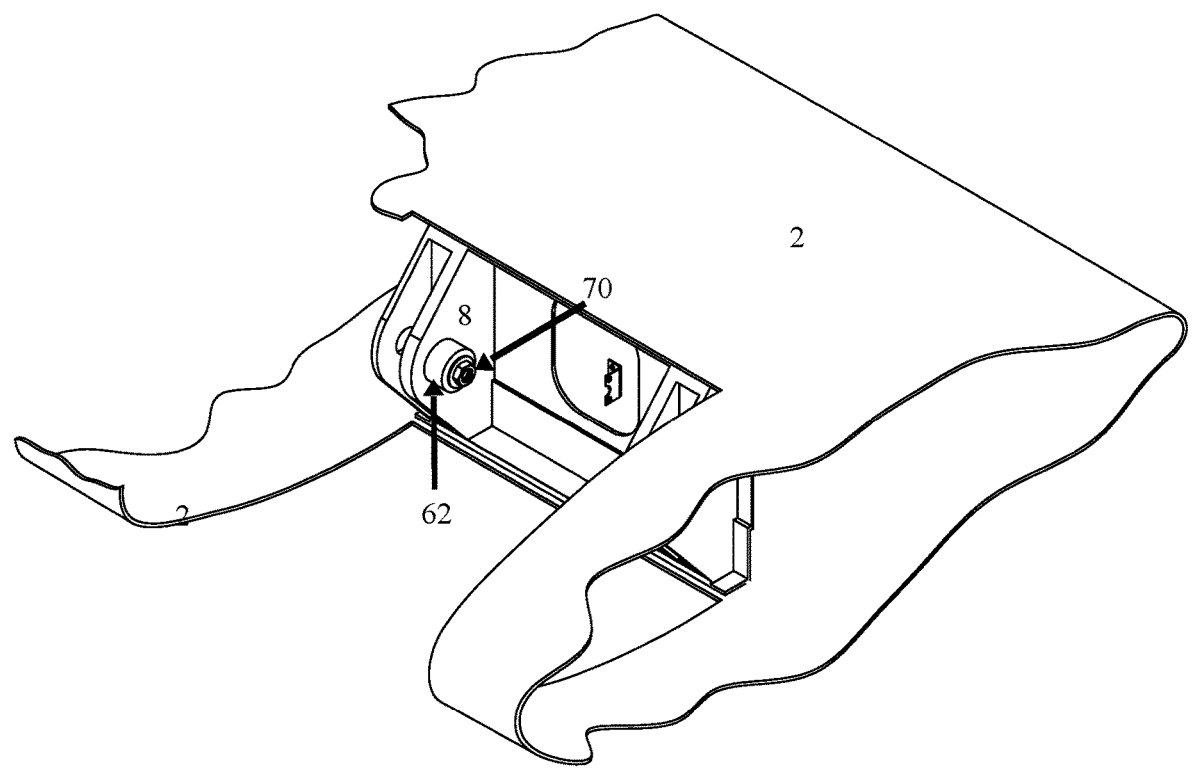
Figure 23A:
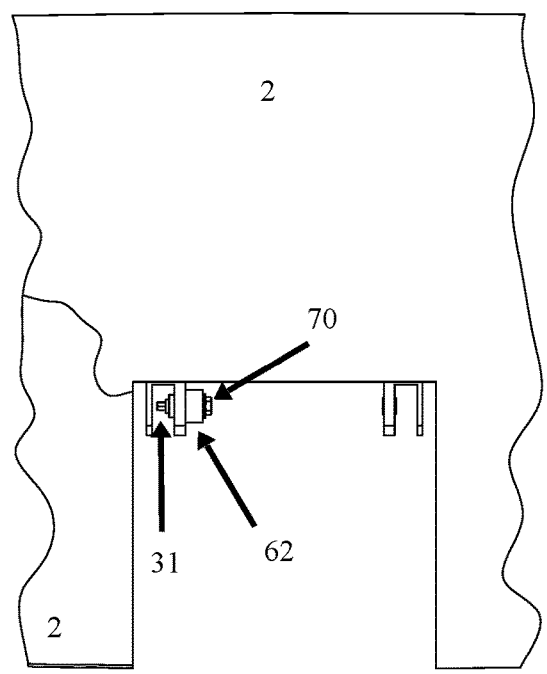

An angled top view of the FIG. 21 is shown in FIG. 23, while a top view of FIG. 21 is shown in FIG. 23A.

Figure 24:
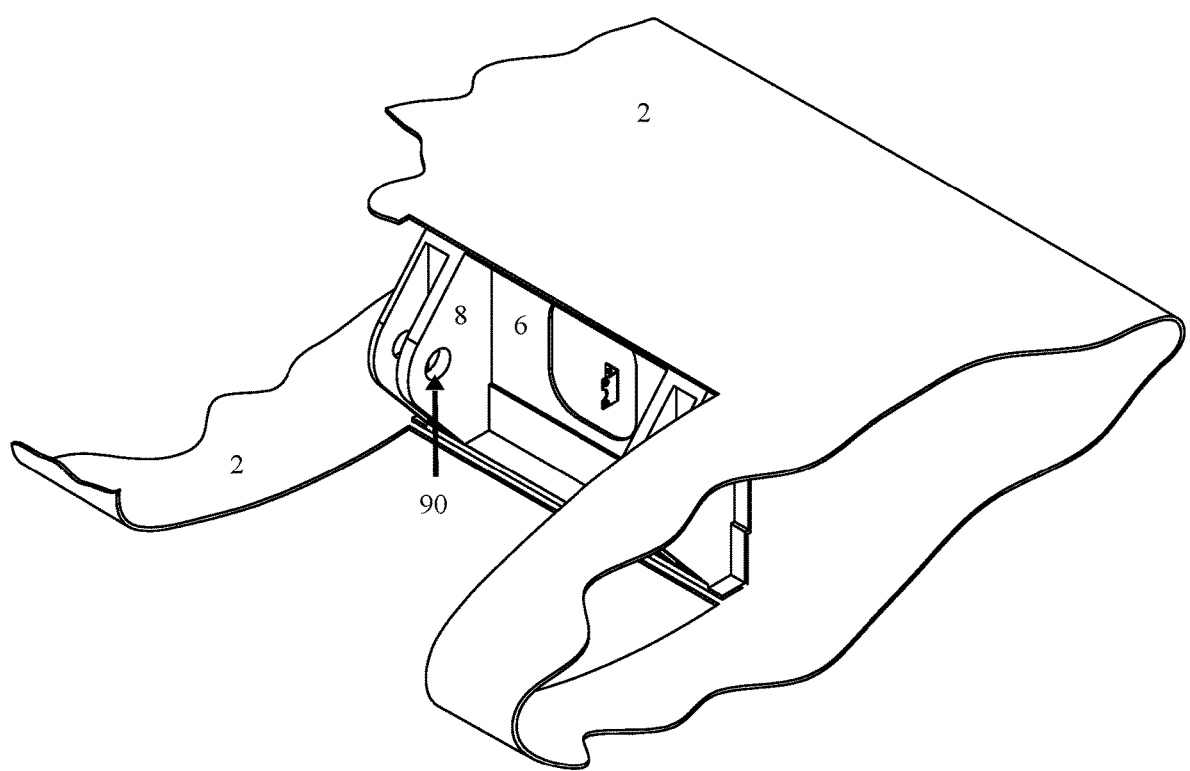

FIG. 24 illustrates an Apache stabilizer without an aileron bearing.

Figure 25:
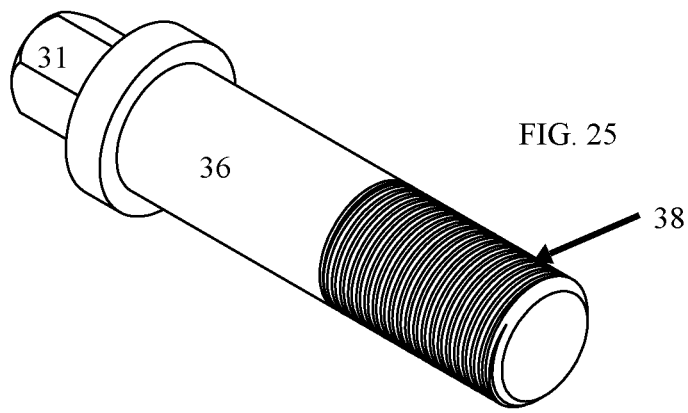
Figure 26:
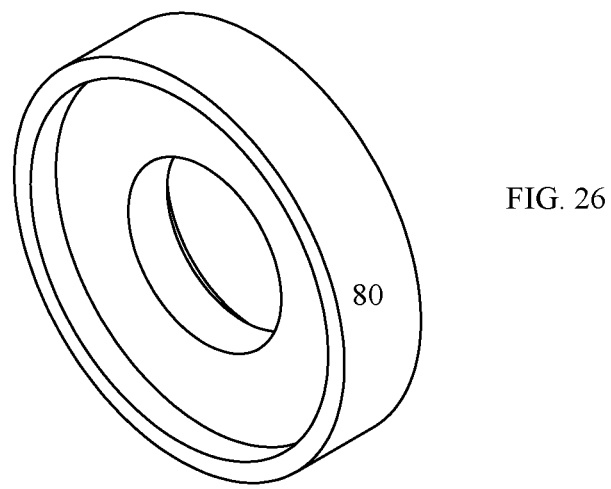
Figure 27:
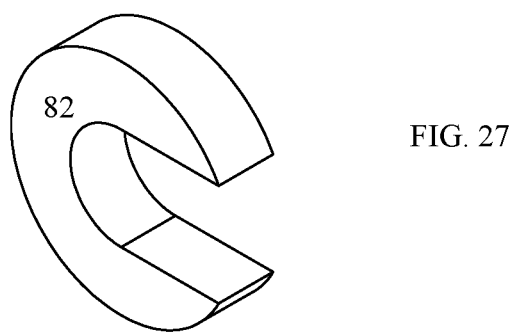

The Delta cutting bolt is shown in FIG. 25, the Delta bearing plunger, and FIG. 26 depicts the Delta bearing yoke. FIG. 27 illustrates the yoke.

FIGS. 28 through 34A depict the staking assembly and parts thereof of the Apache Helicopter Stabilizer Bearing Replacement Kit. FIG. 28A illustrates and exploded view of FIG. 28.

Figure 40:
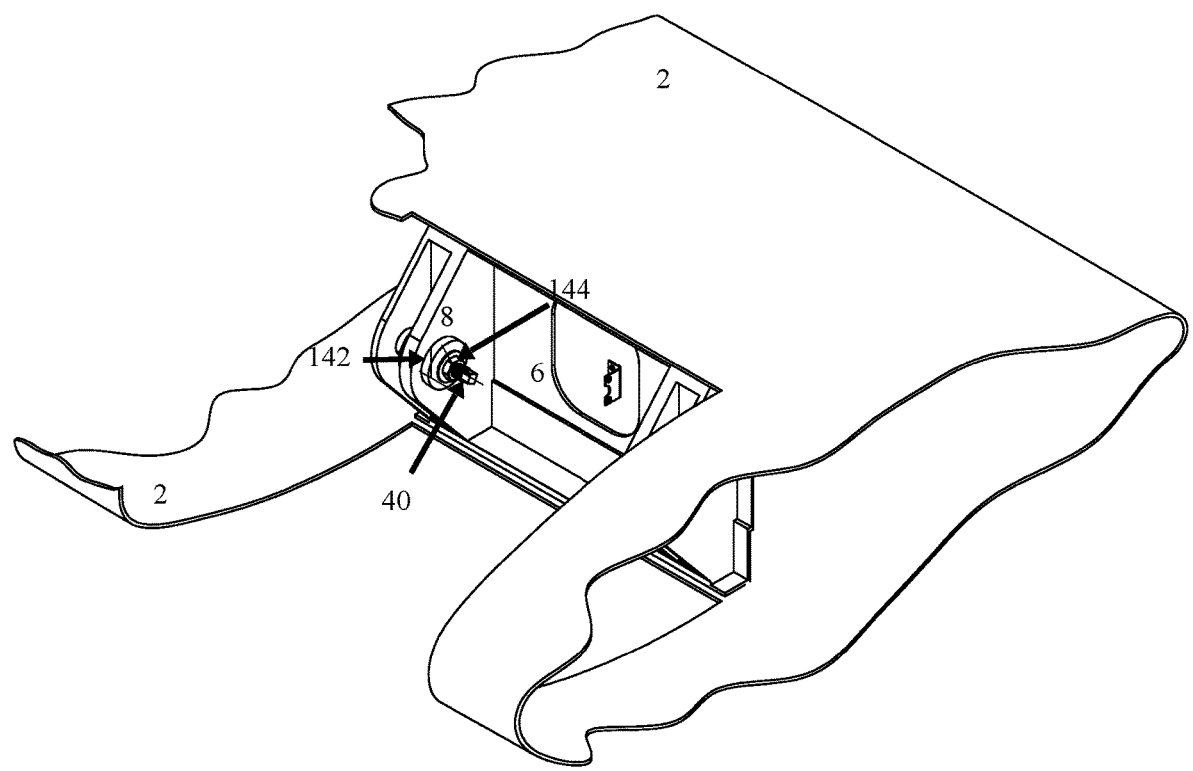
Figure 40A:
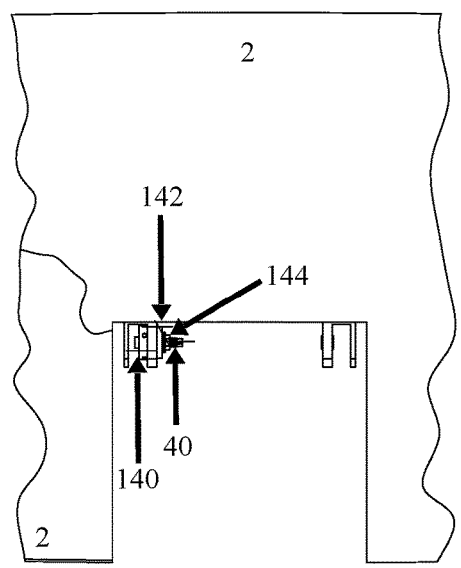

FIGS. 35 through 40A depict the installation of a new bearing into the Echo model of the Apache Helicopter utilizing the Apache Helicopter Stabilizer Bearing Replacement Kit. FIG. 40 illustrates an angled, front view of 40A.

Figure 41:
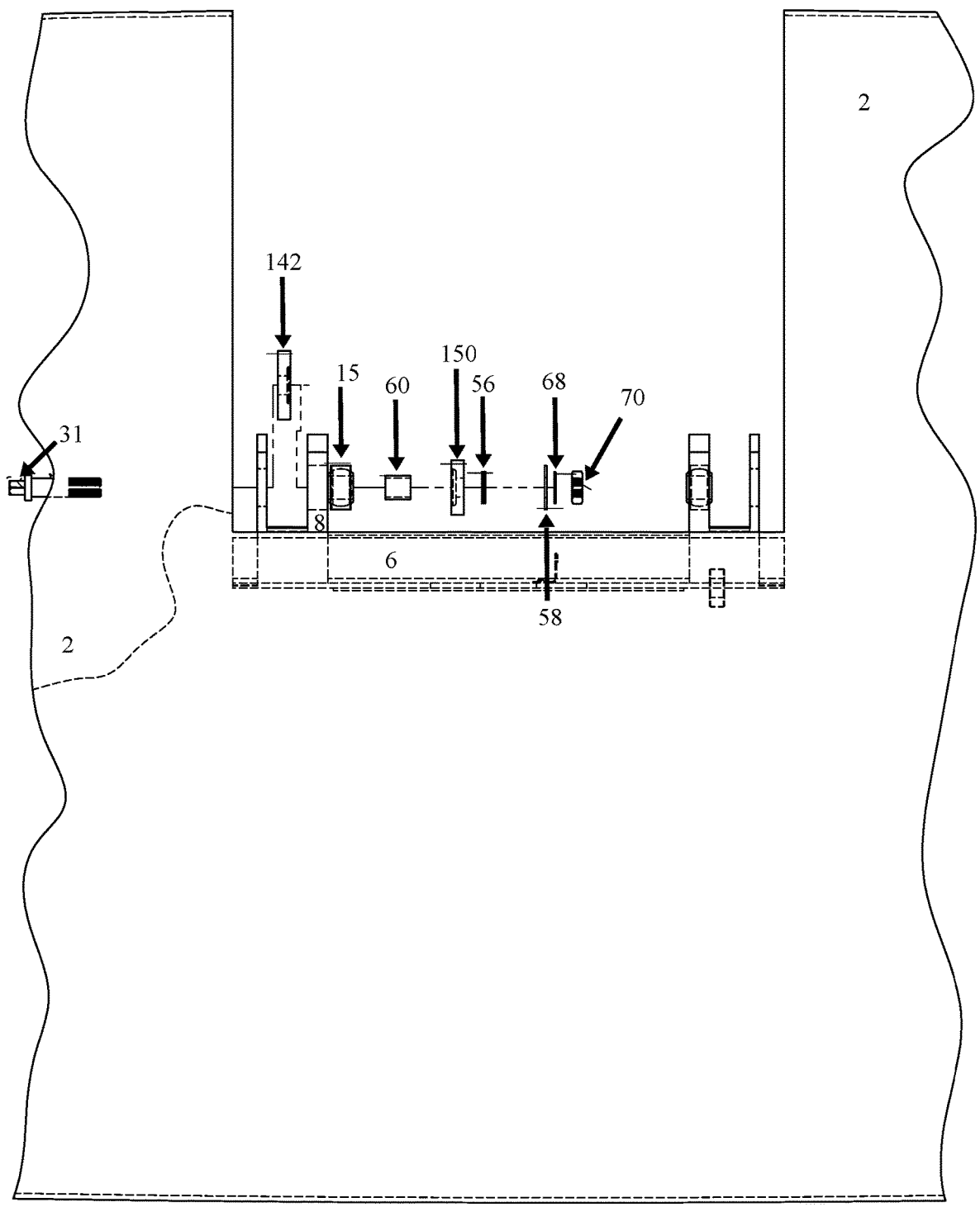
Figure 42:
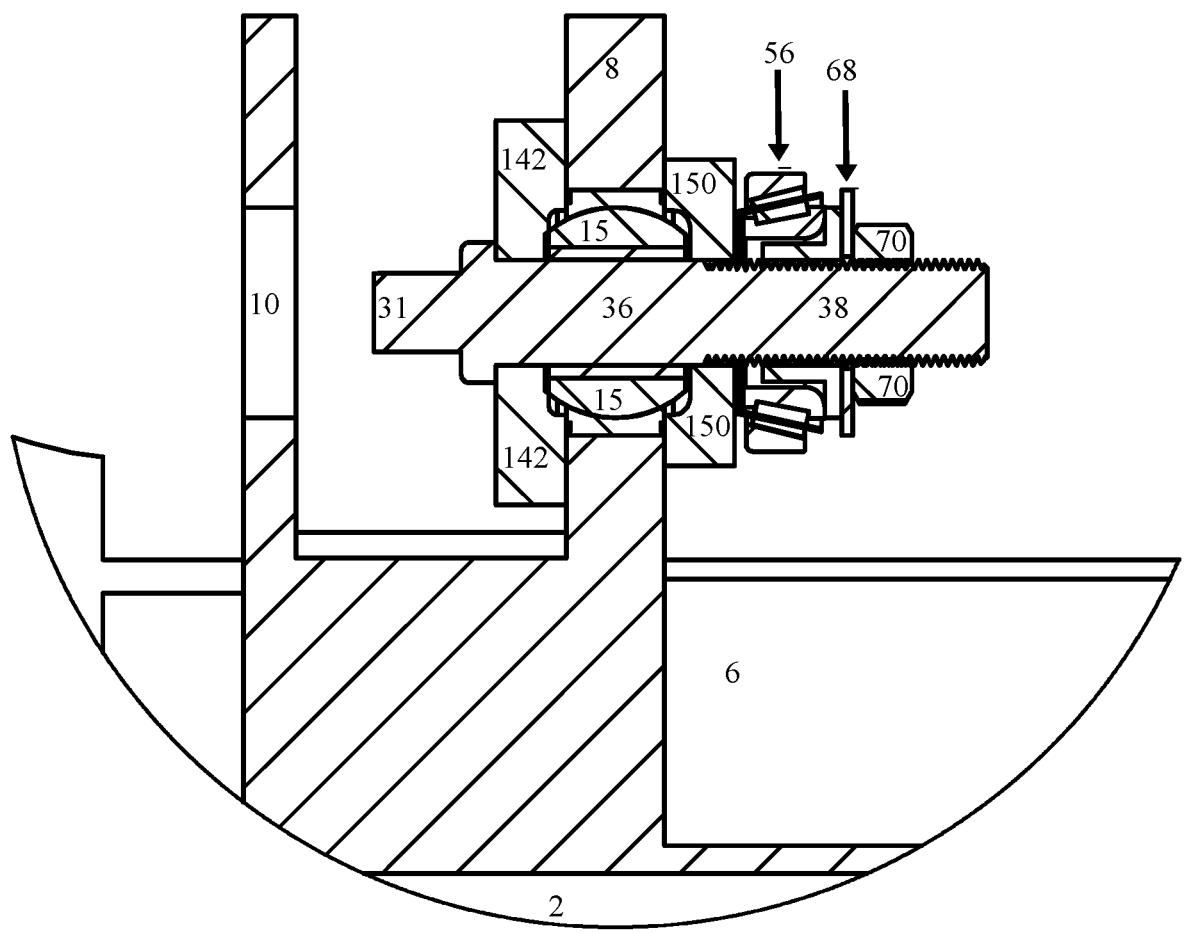
Figure 43:
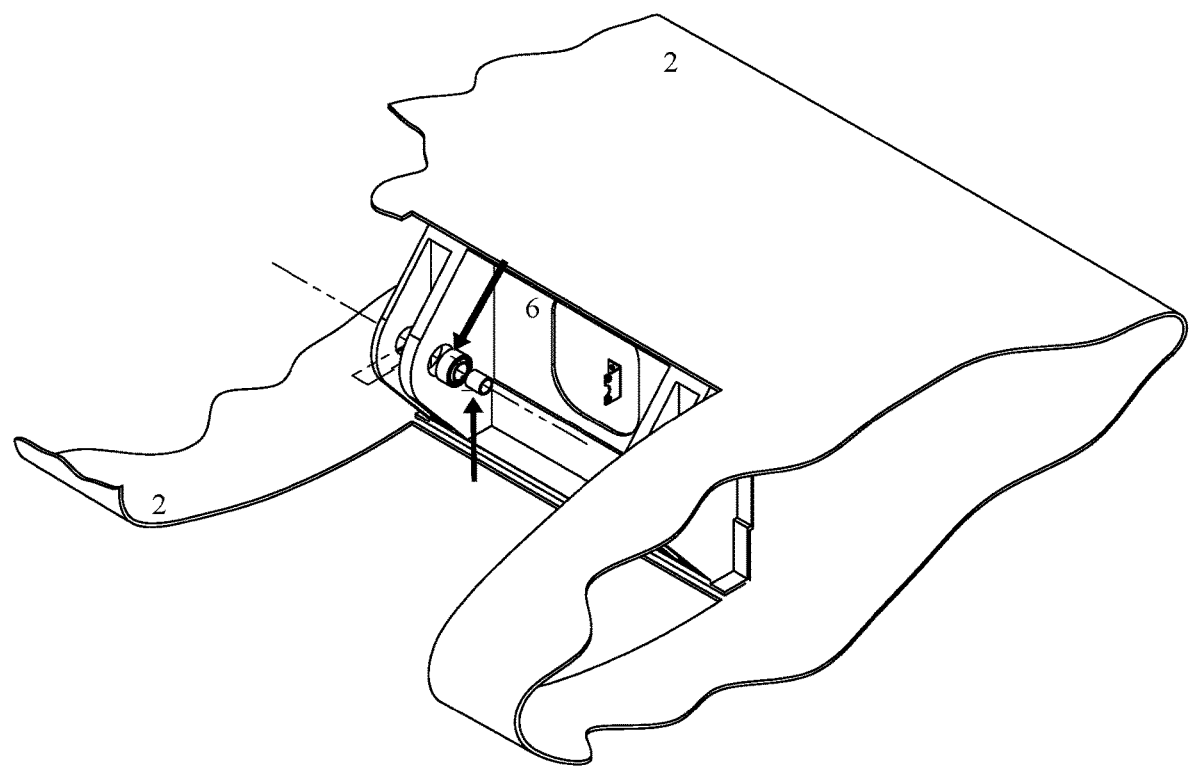
Figure 43A:
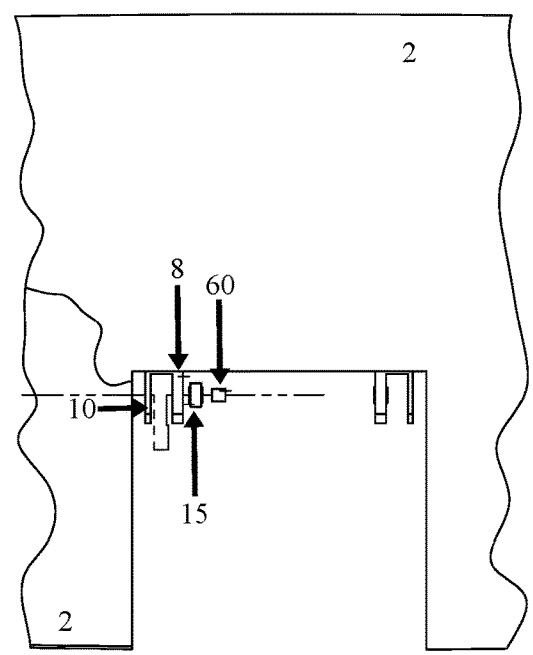
Figure 44:
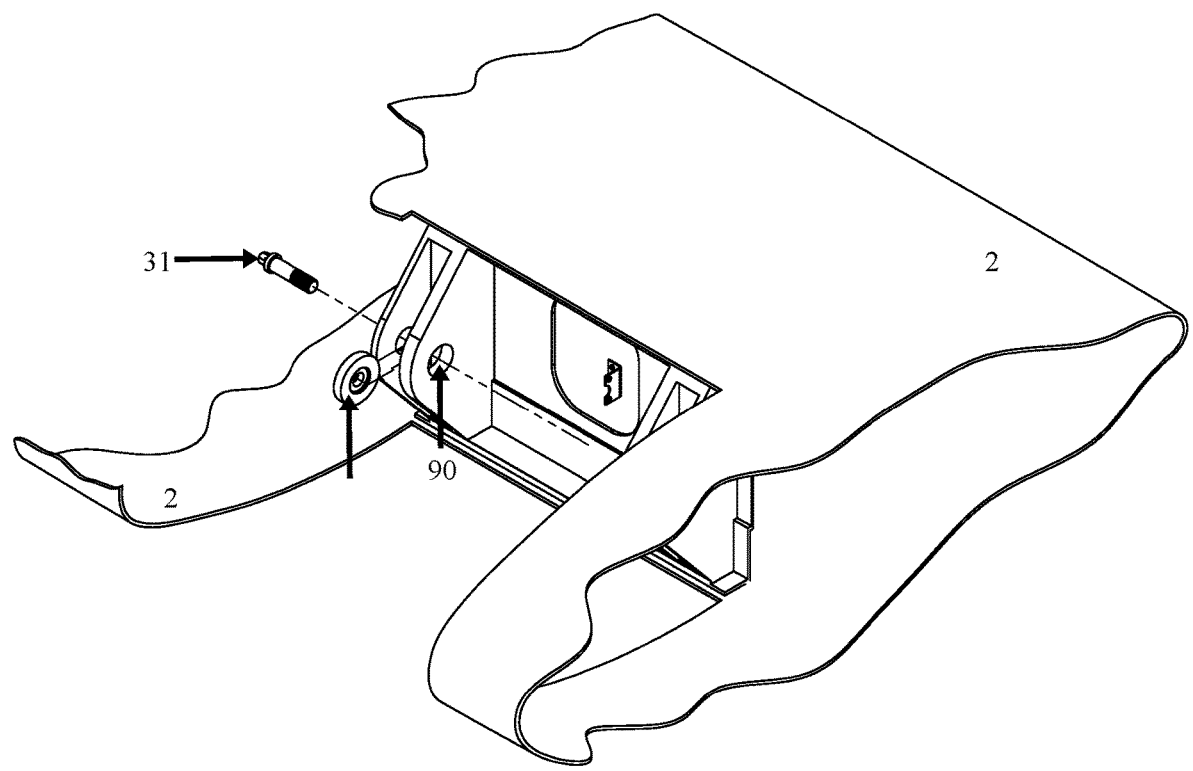
Figure 44A:
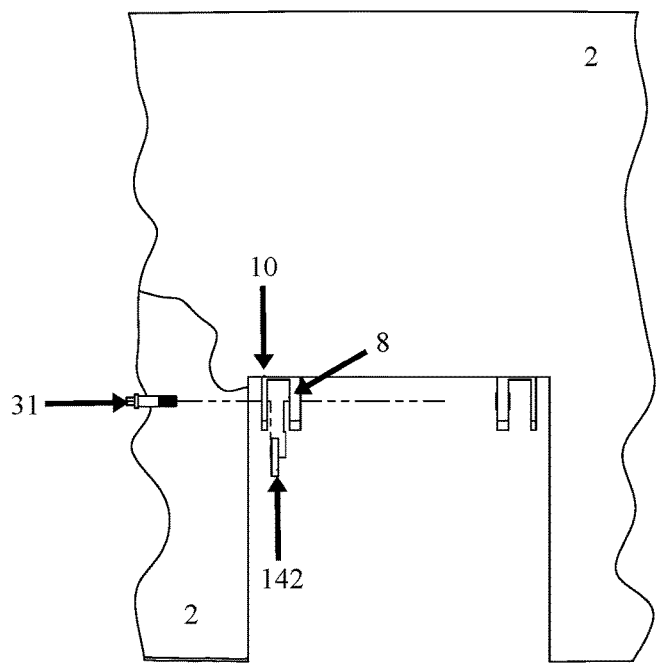
Figure 45:
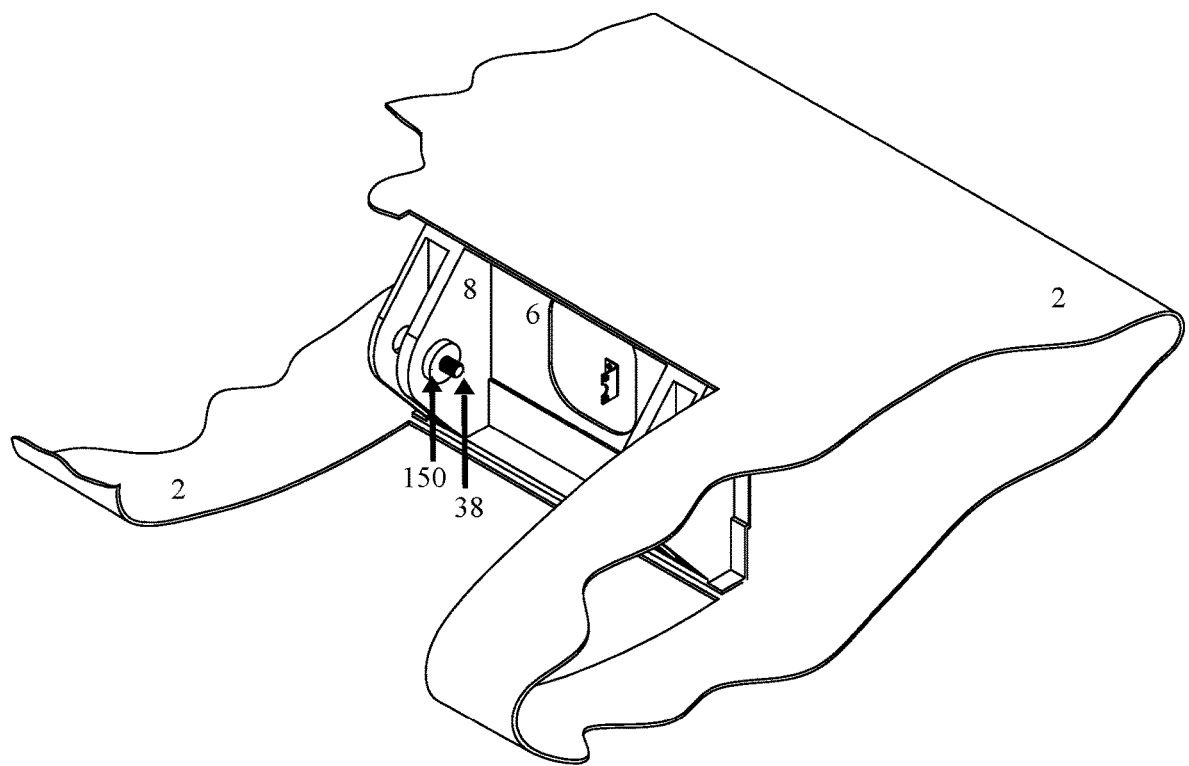
Figure 45A:
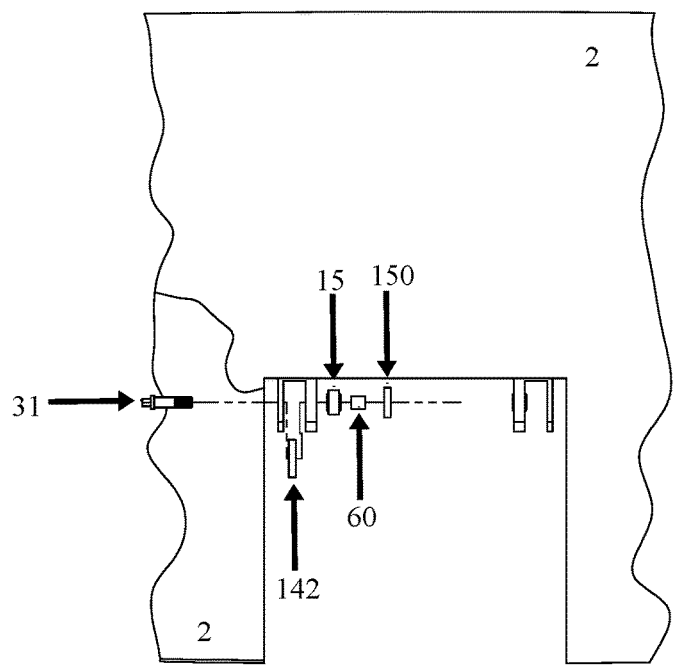
Figure 46:
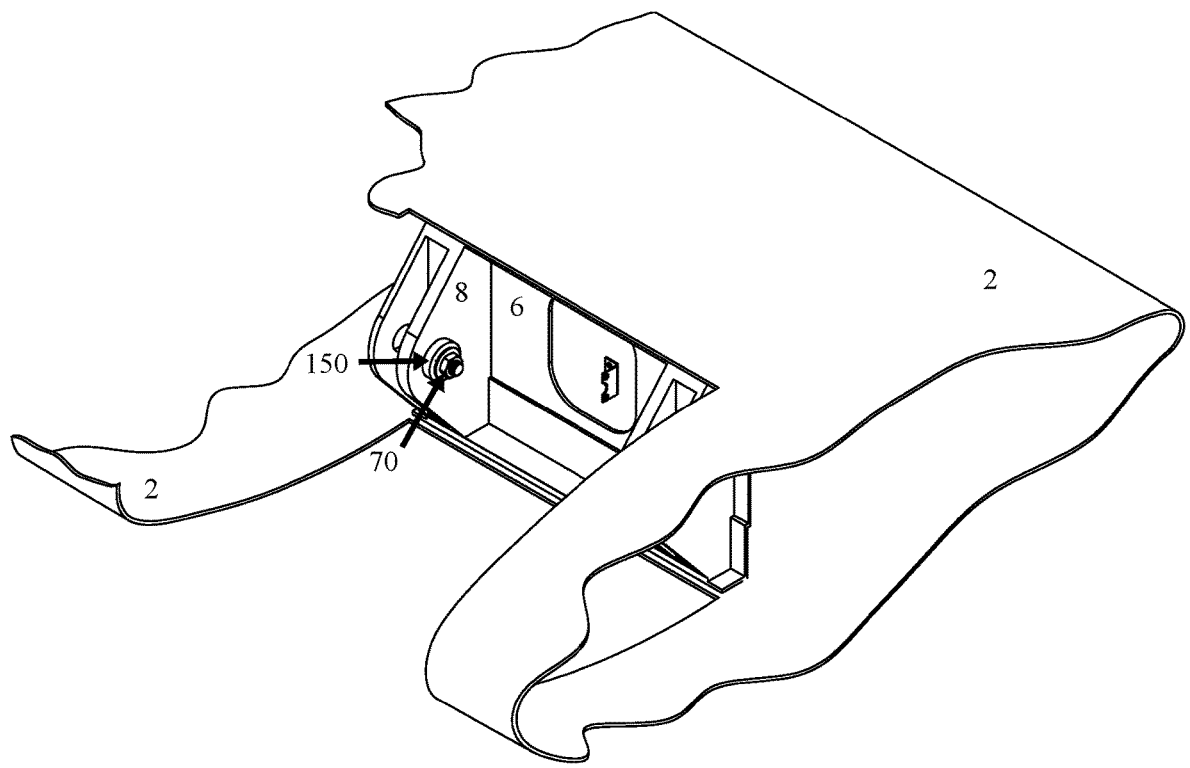
Figure 46A:
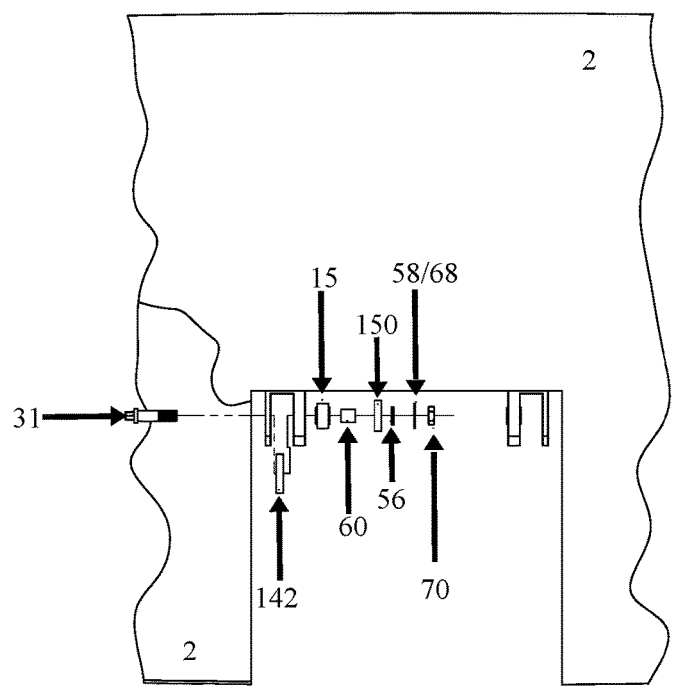
Figure 47:
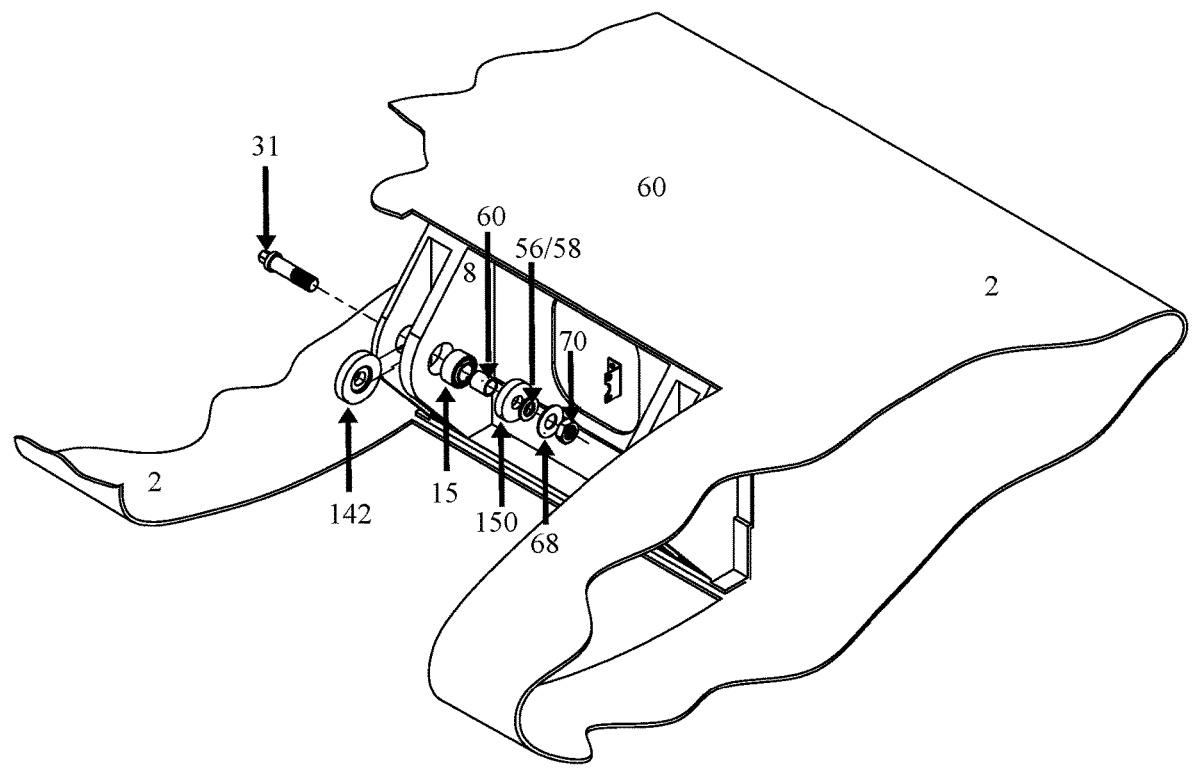
Figure 47A:
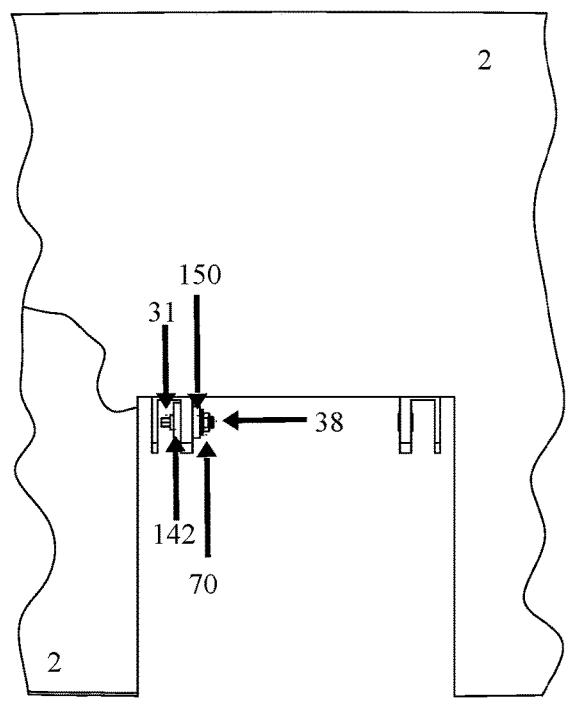

FIGS. 41 through 41 through 47A depict the installation of a new bearing into the Delta model of the Apache helicopter using the Apache Helicopter Stabilizer Bearing Replacement Kit.

Figure 48:
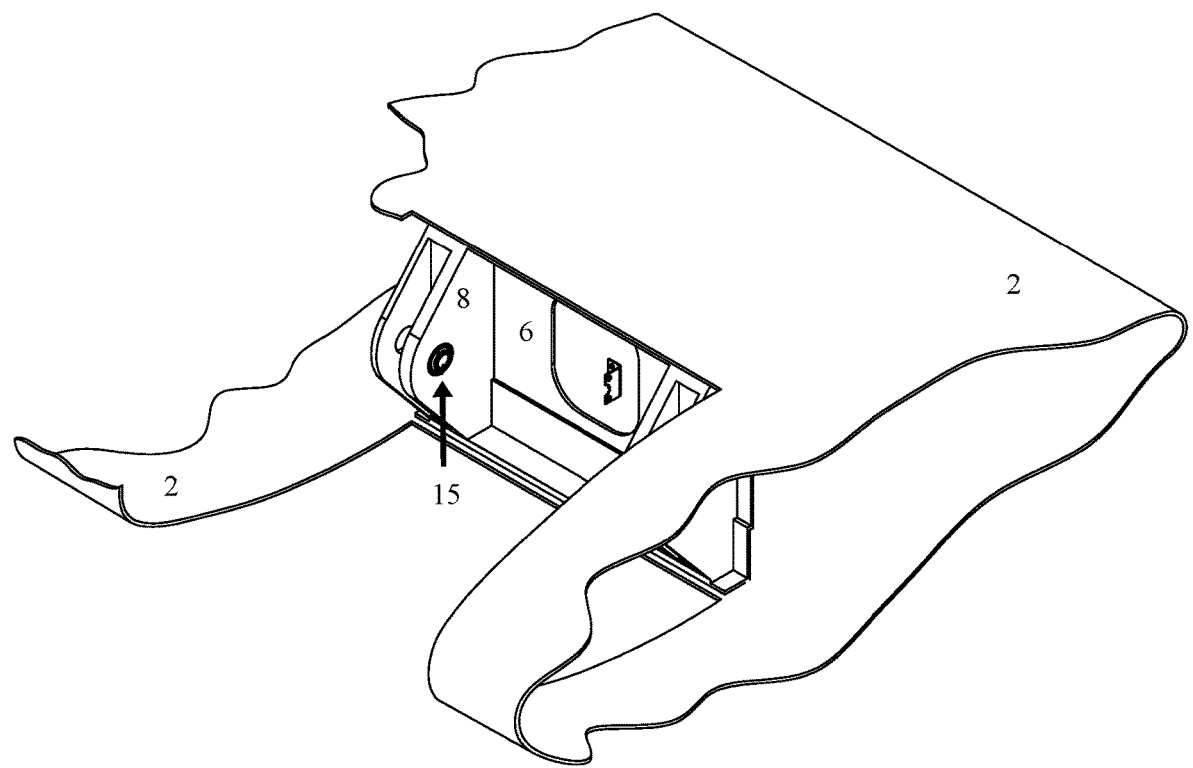
Figure 48A:
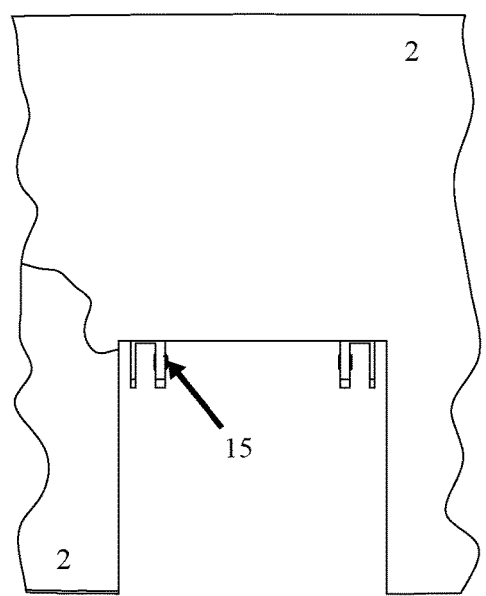
Figure 49:
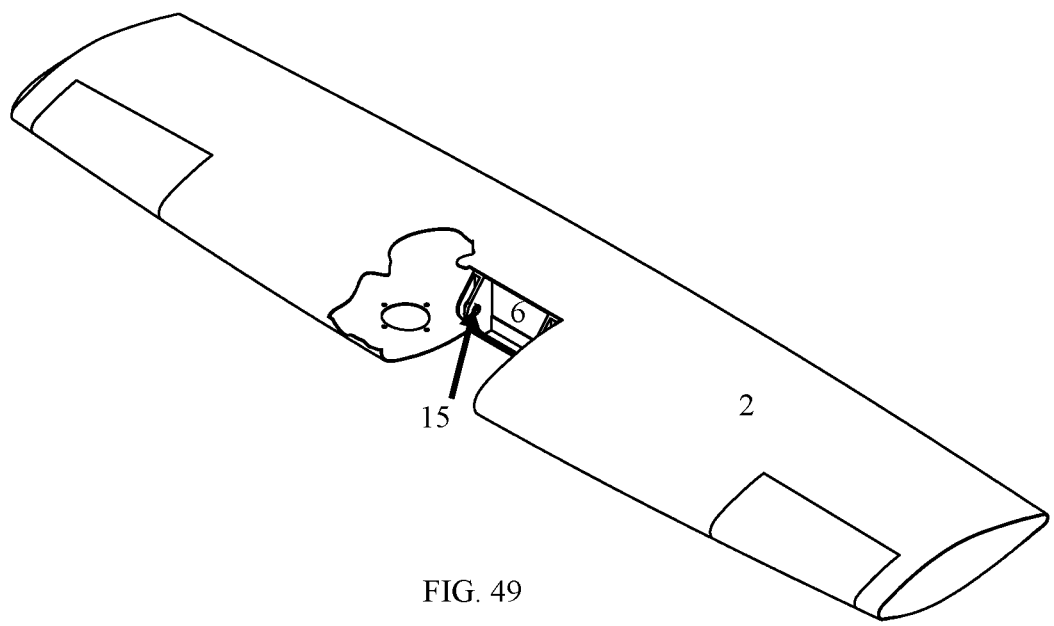
Figure 50:
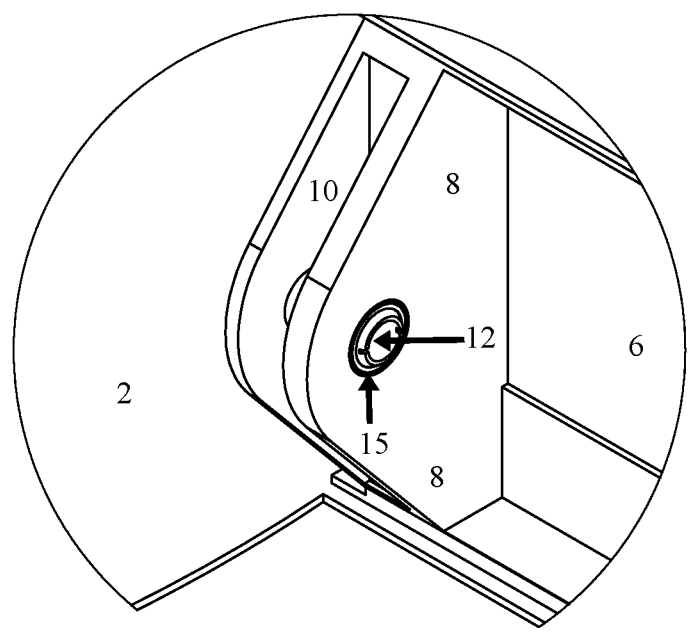

FIGS. 48 through 50 depict the Apache helicopter with a replacement bearing installed.

DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

This invention comprises four parts: removal of the damaged bearing and housing from the Apache stabilizer, removal of the damaged bearing from its housing, installation of a replacement bearing within the housing, staking the bearing to create a "V" groove along the rim of the replacement bearing securing it within the housing, and reinstallation of the replacement bearing and housing into the Apache stabilizer. The removal of the damaged bearing and housing is depicted in FIGS. 5 through 27. The staking process is shown in FIGS. 28 through 34A. Installation of the replacement bearing and housing is depicted in FIGS. 35 through 50.

The invention herein allows an Apache stabilizer to be serviced in the field. The invention is portable and can be performed in any remote location where service is needed. This saves tremendous man hours and time relating to transportation of the stabilizer and allows the Apache to be returned to service faster, which is critical in meeting mission demands. The stabilizer must be detached from the aircraft so that the worn bearings can be serviced.

The invention herein comprises a kit that includes all necessary tools and parts to remove, stake, and replace a bearing in the Apache. At this time, the Apache comprises two models: the Delta and the Echo. The Delta model has a wing skin of carbon fiber, while the Echo has an aluminum skin. The Delta and Echo also have slightly different stabilizer configurations requiring separate and distinct removal and installation processing. These configuration differences require two separate kits with different parts and/or part sizes. Model differences will be noted throughout when applicable. Generally, the Delta model parts are smaller than the Echo model parts.

Figure 1:
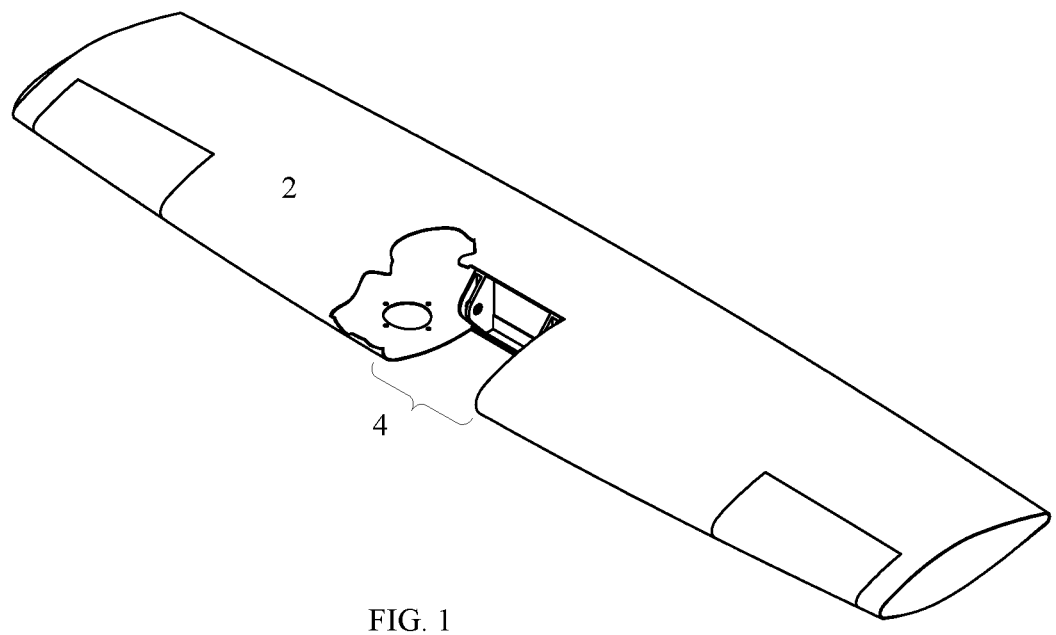
FIGS. 1 through 50 depict the Apache Helicopter Stabilizer Bearing Replacement Kit. In the Figures.
Figure 2:
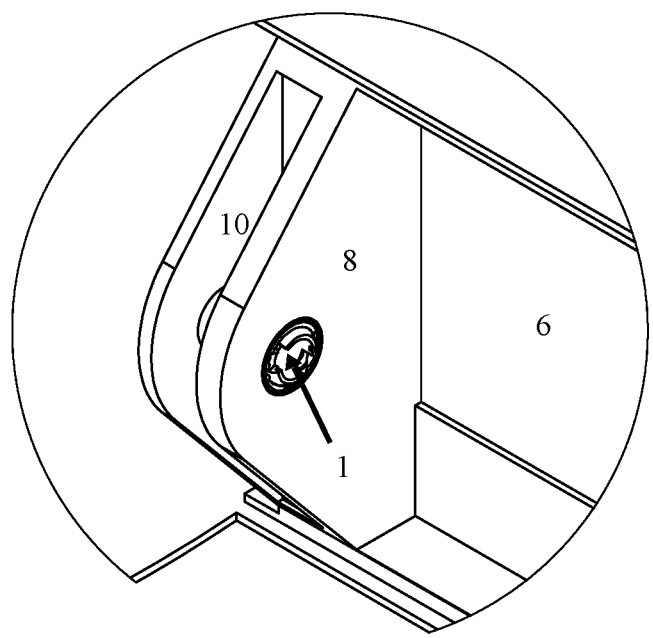

FIG. 1 depicts the stabilizer 2 detached from the Apache. Stabilizer 2 is shown with the access cover removed so that bearing access area 4 is seen. FIG. 2 is a close up of damaged bearing 1. The Apache utilizes aileron bearings. Inner stabilizer bracket (inner stabilator) 8 and outer stabilizer bracket (outer stabilator) 10 are coupled to stabilizer panel 6. Damage located on damaged bearing 1 is visible while looking at inner stabilator 8.

Figure 3:
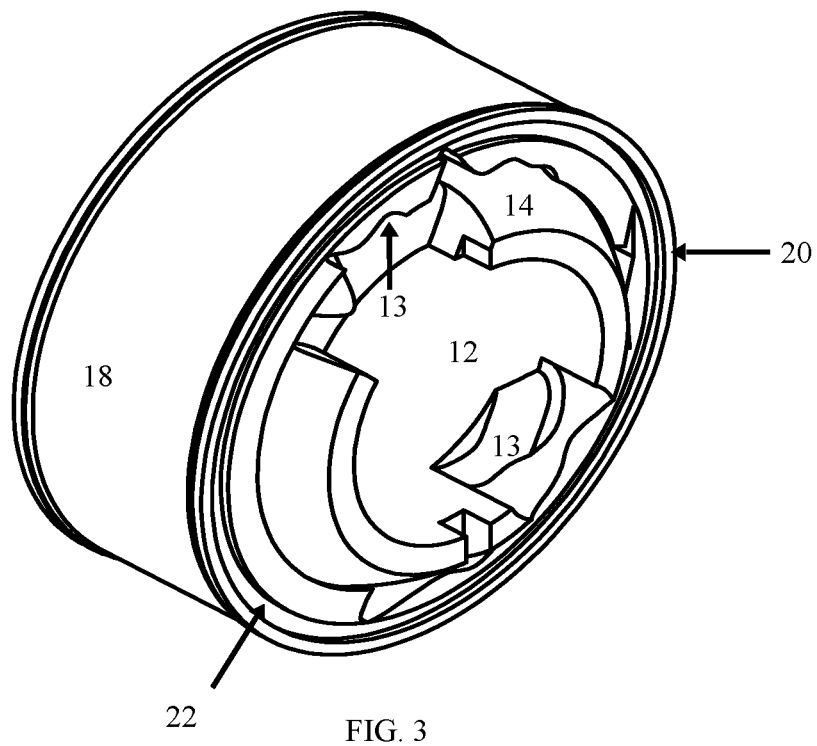
Figure 4:
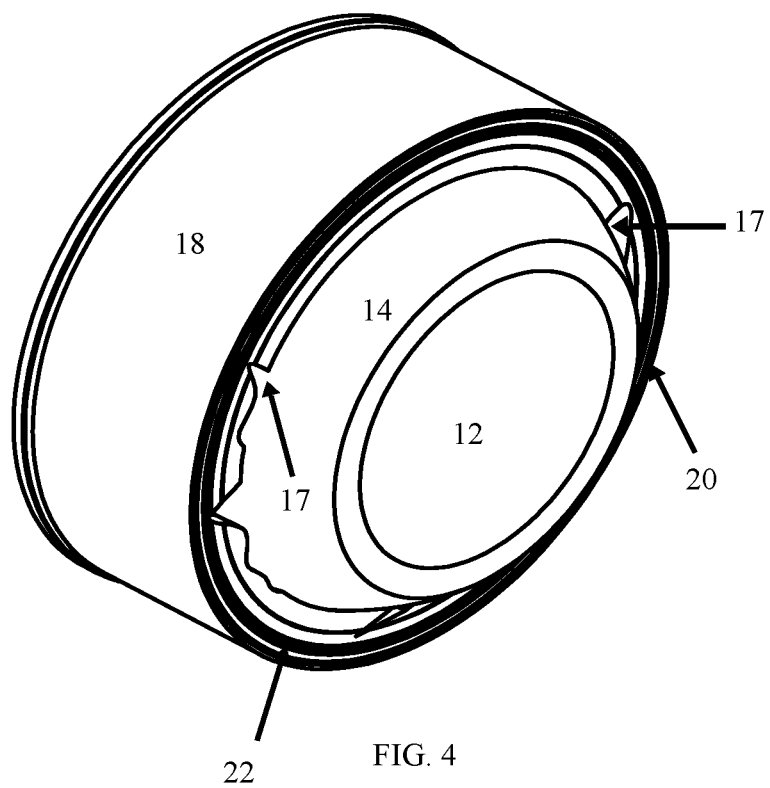
Figure 5:
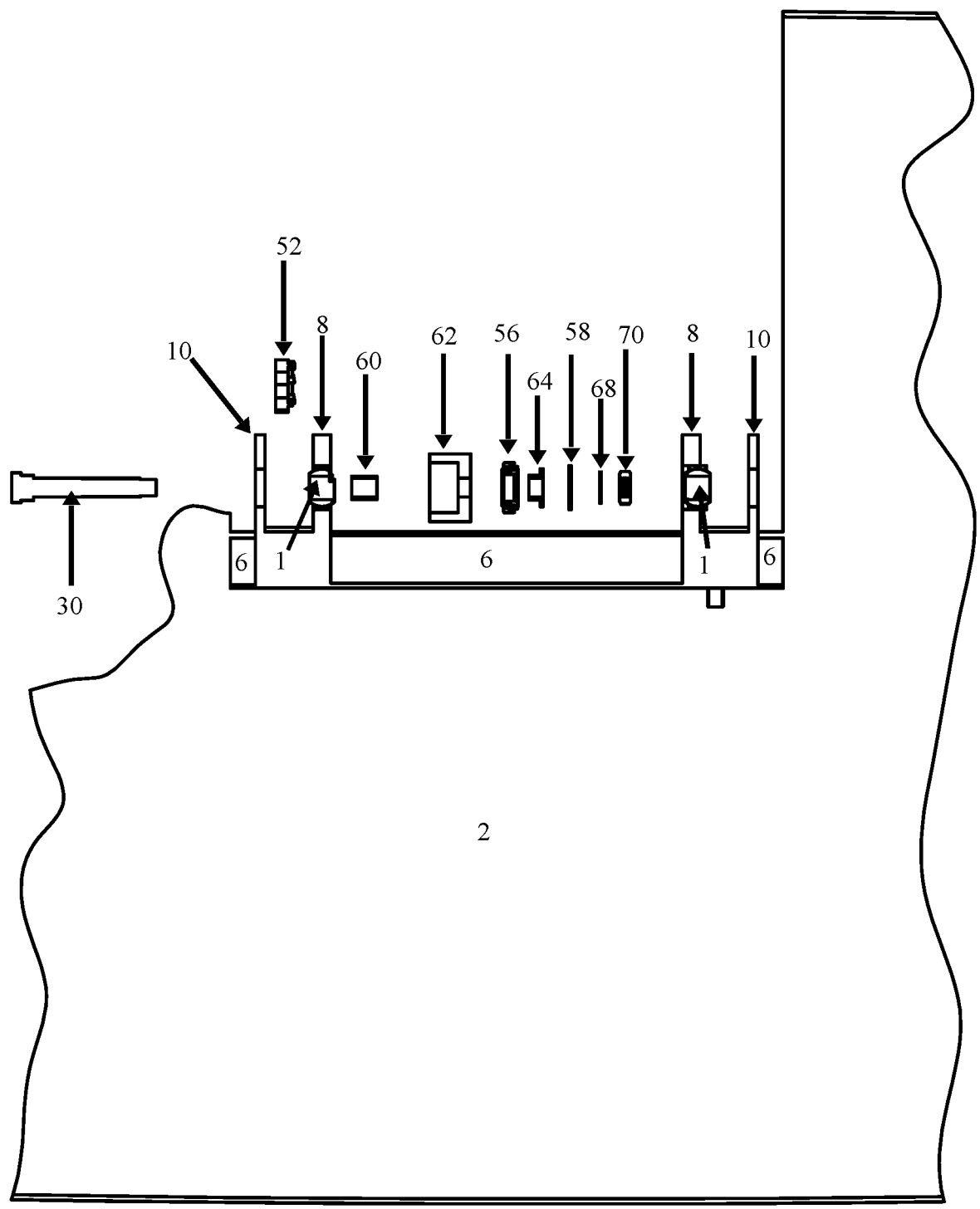

FIGS. 3 and 4 depict damaged bearings removed from stabilizers. A damaged bearing 1 is shown in FIG. 3. FIG. 3 includes damage 13 to ball bearing 14. Cavity 12 of damaged bearing 1 is no longer smooth. Bearing housing lug 18 houses ball bearing 14. A "V" groove is formed by edges 20 and 22, which are angled and meet each other forming a "V" shape. A second damaged bearing 1 is shown is FIG. 4. The "V" groove formed by edges 20 and 22 is damaged in two places at damage 15.

The first step in removing a damaged bearing is to cut the bearing. FIGS. 5 through 19A depict removal of damaged bearing 1 in the Echo model. In the Echo model the following parts in order are utilized: hexagonal bolt 30 with a hexagonal head, hexagonal cutting head 52, inner bearing bushing 60, spacer cup 62, thrust bearing bushing 56, thrust bearing spacer 64, flat washers 85 and 68, and hex nut 70. These parts assembled together are herein referred to as "cutting stack assembly".

Figure 6:
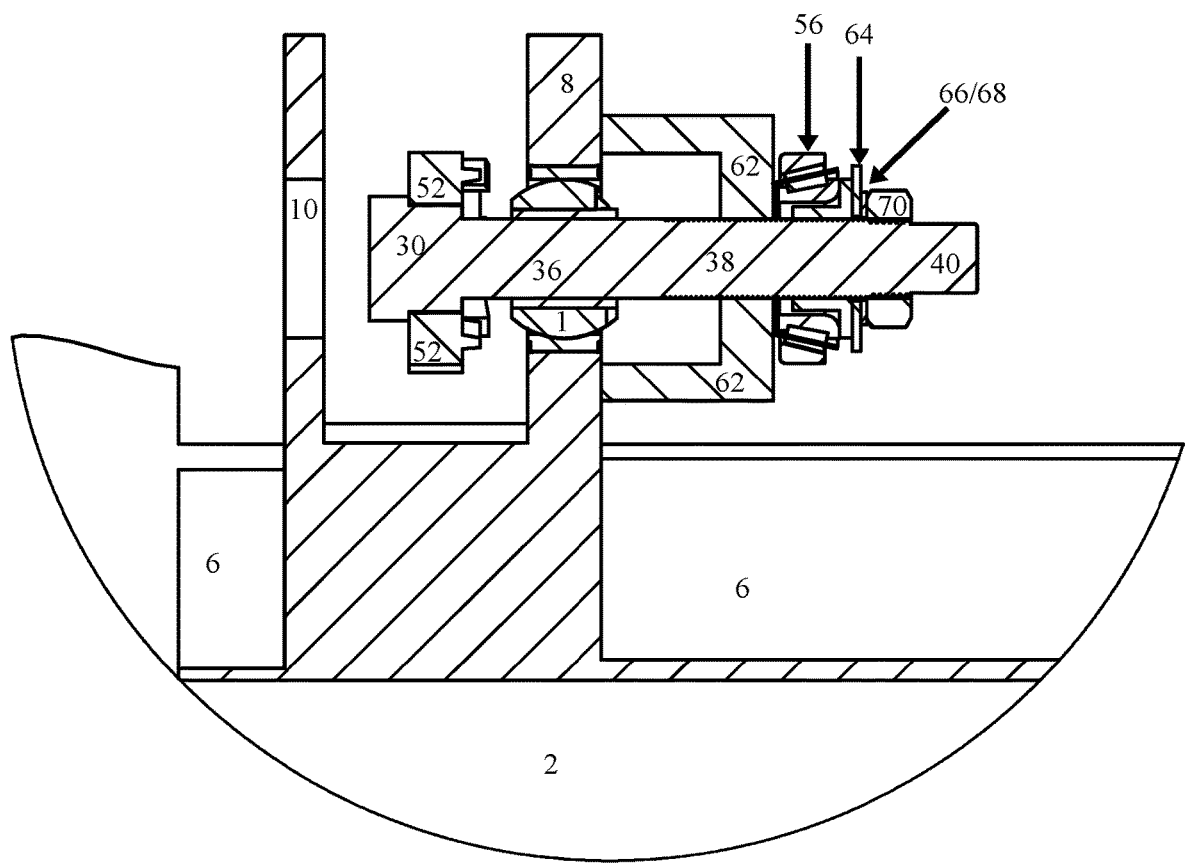

The damaged aileron bearing 1 is shown installed in stabilizer brackets 10 and 8. A top view of stabilizer 2 with the parts exploded within the access area 4 in their correct orientation during the removal process in shown in FIG. 5. A mid-sectional view of the Echo cutting stack assembly is shown in FIG. 6.

Figure 7:
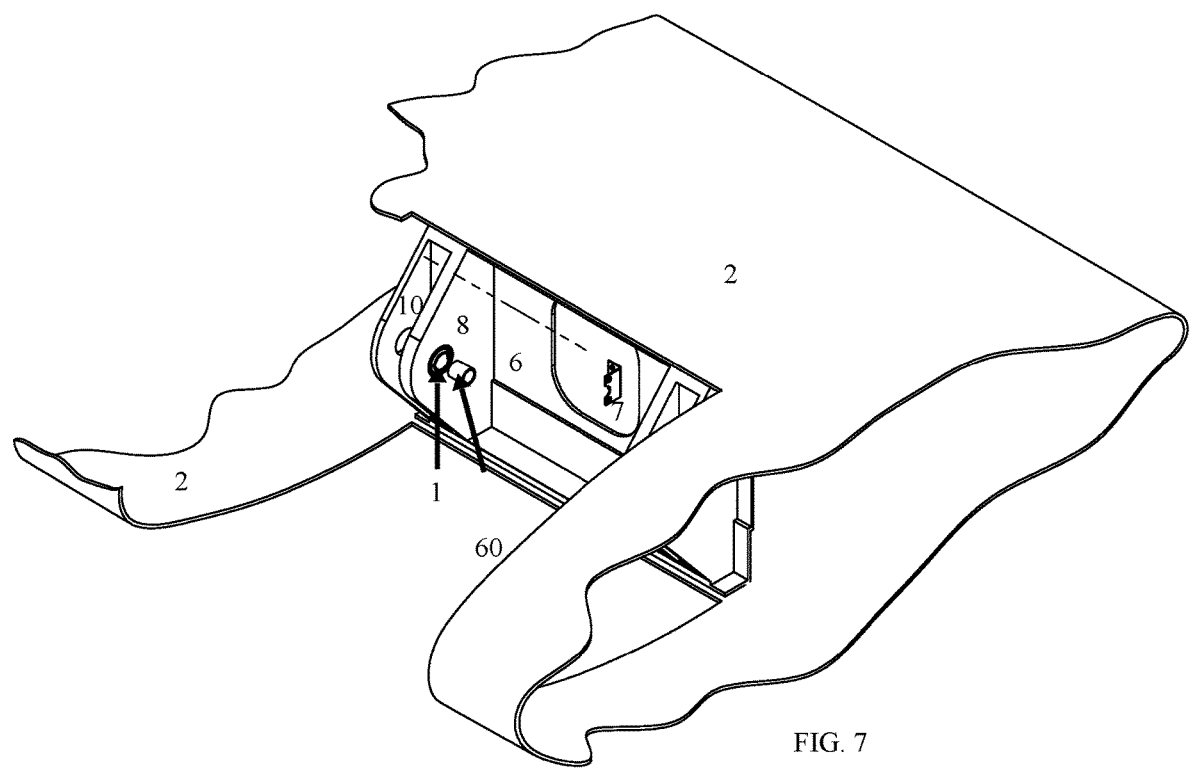
Figure 7A:
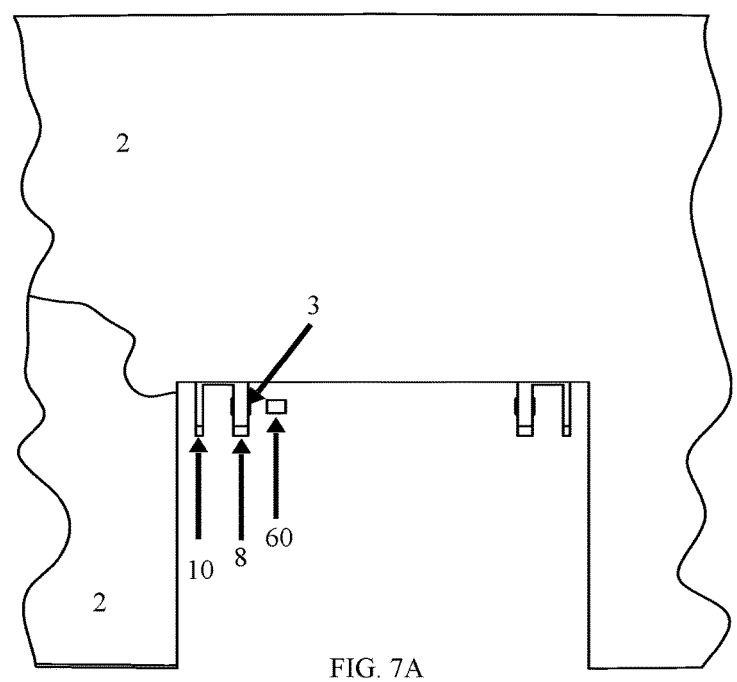
FIGS. 7A, 8A, 9A, 10A, and 11A illustrate top views of the sequential assembly of the Echo cutting stack assembly components onto the stabilizer.
Figure 8:
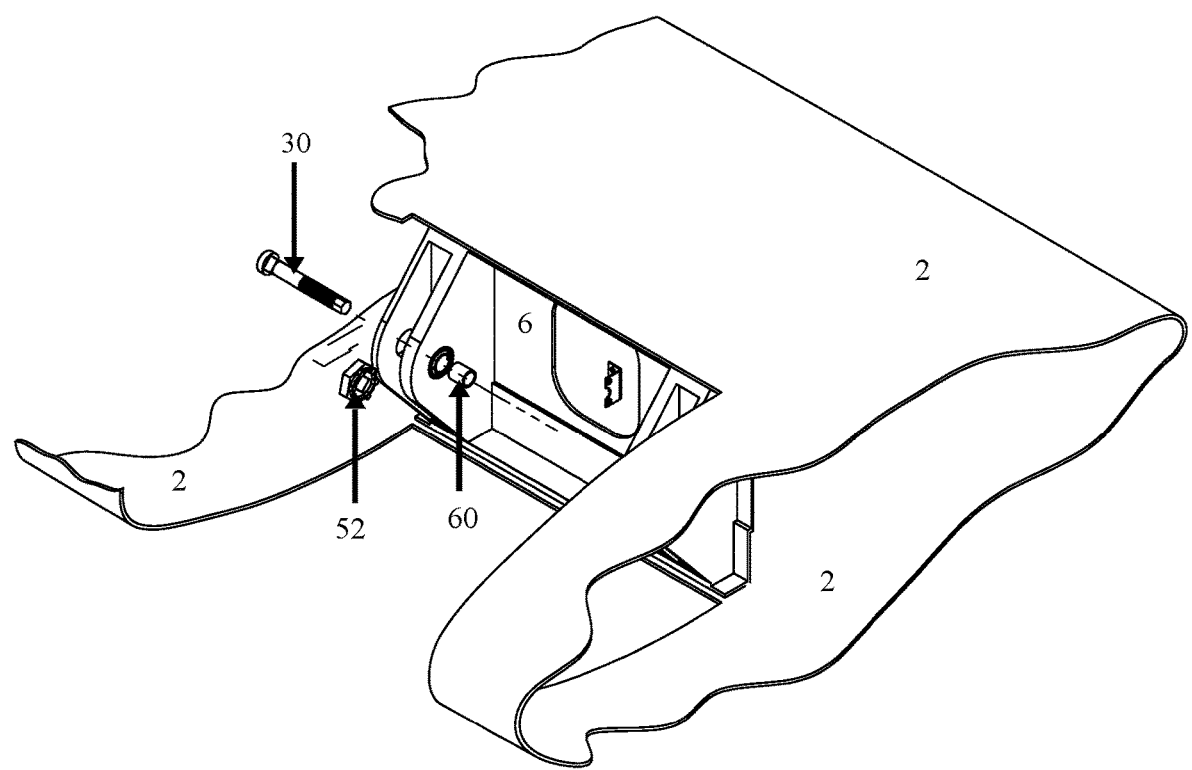
Figure 8A:
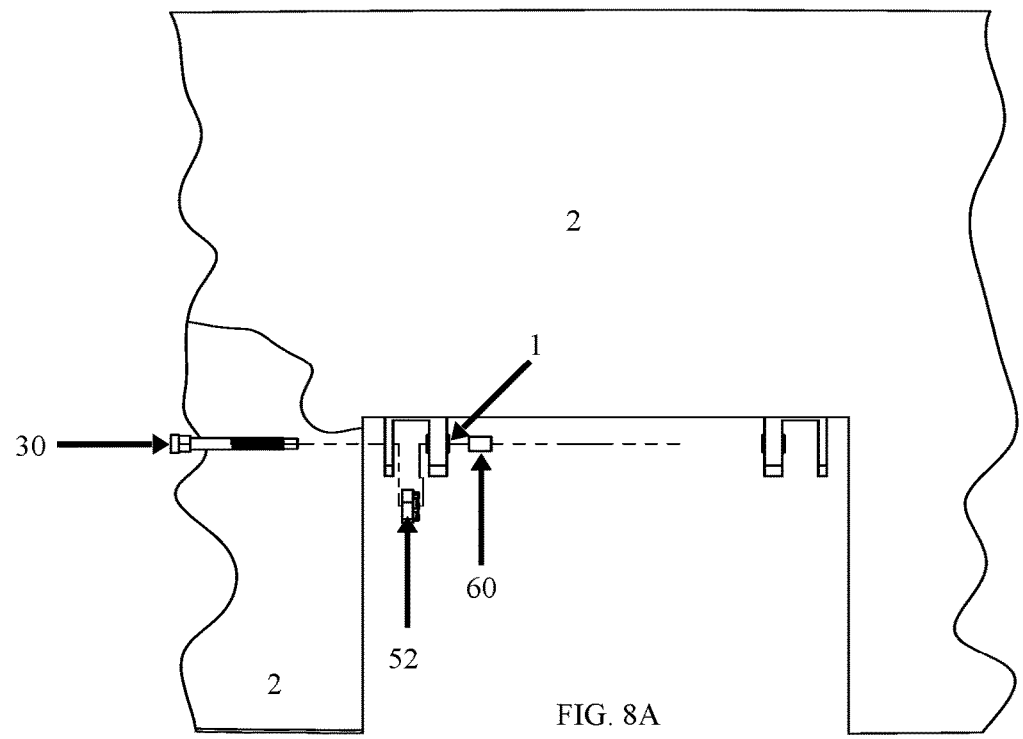
Figure 9:
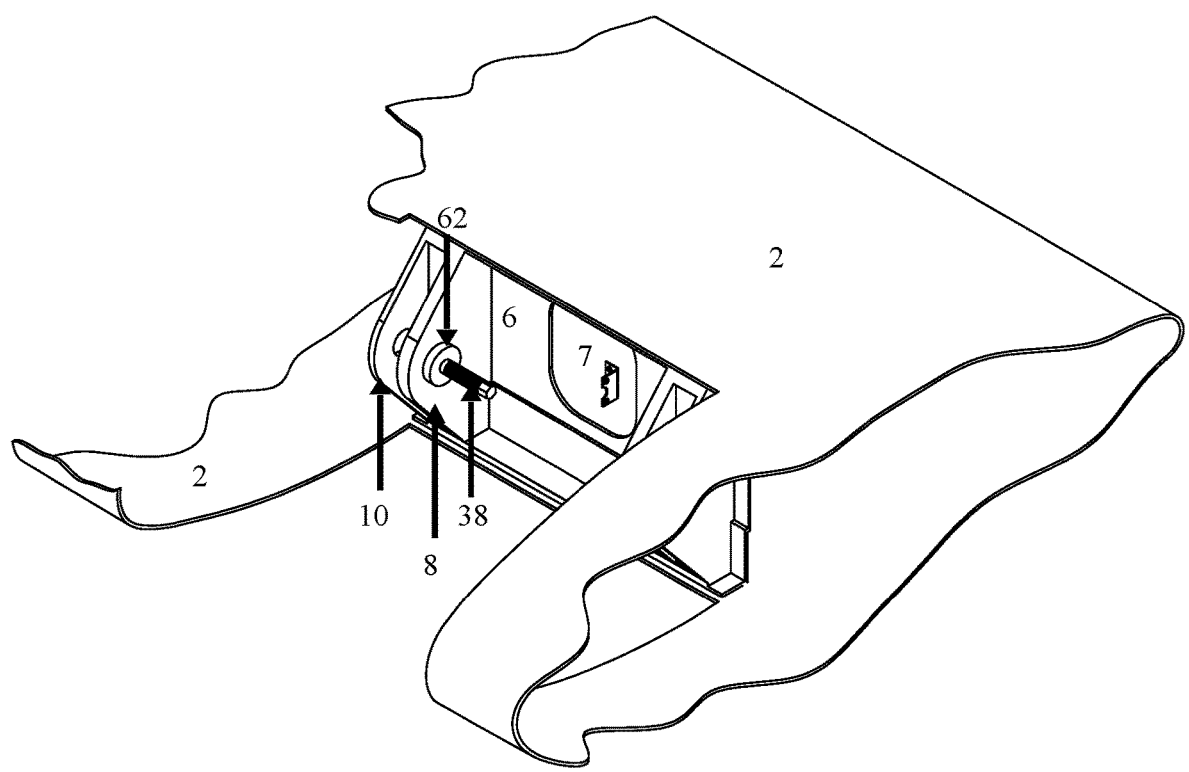
Figure 9A:
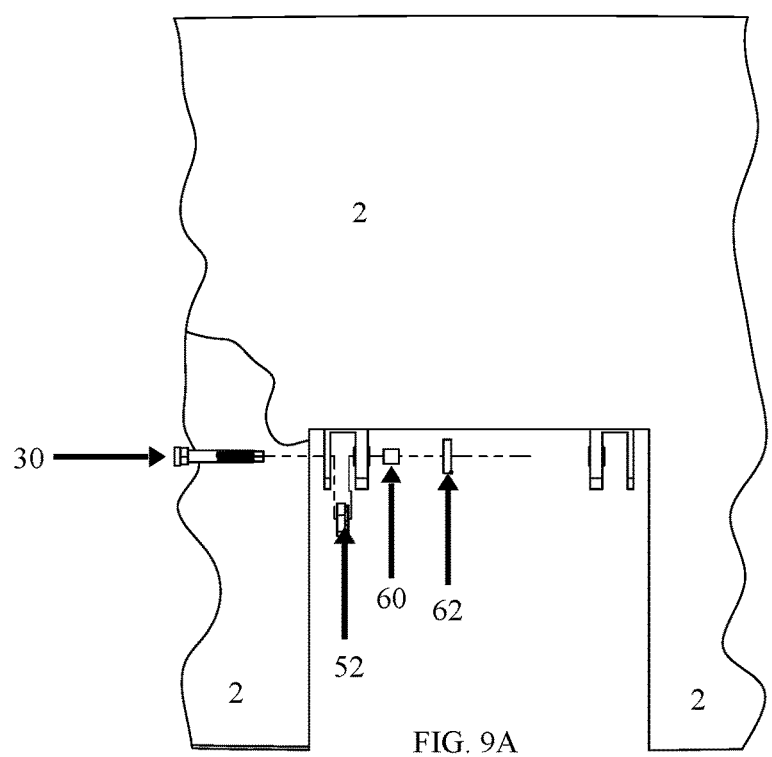
Figure 10:
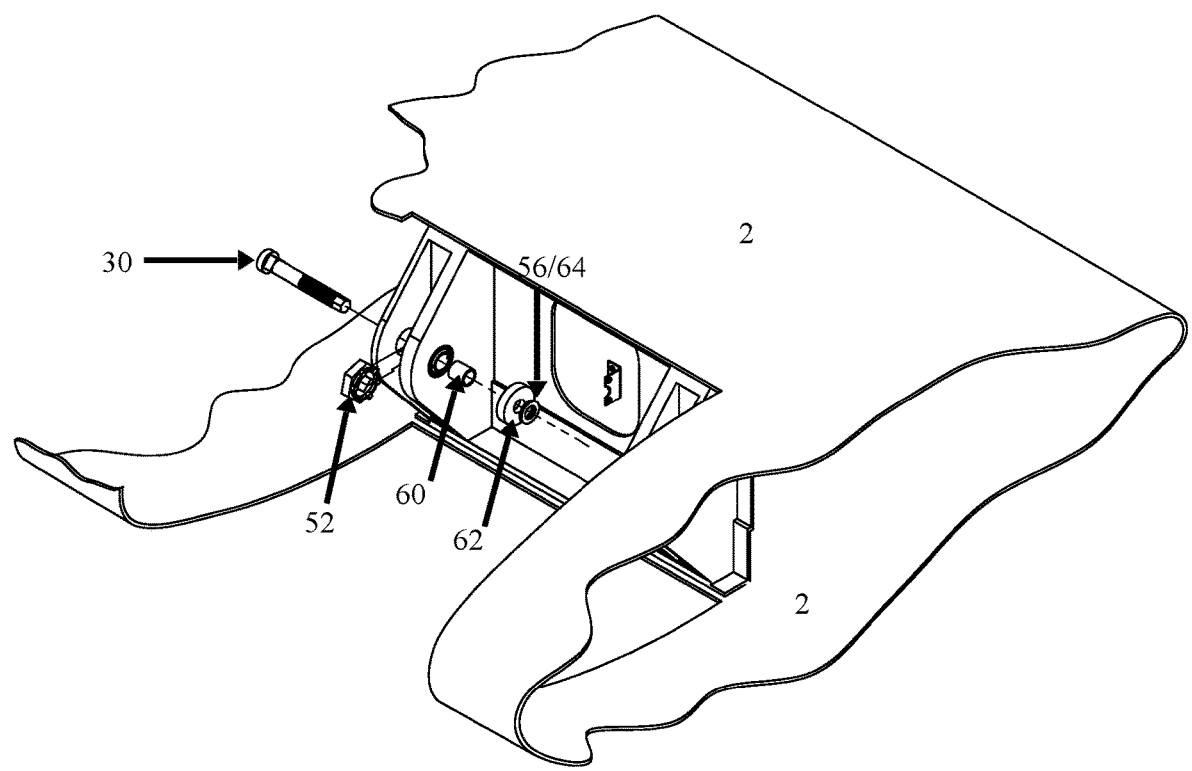
Figure 10A:
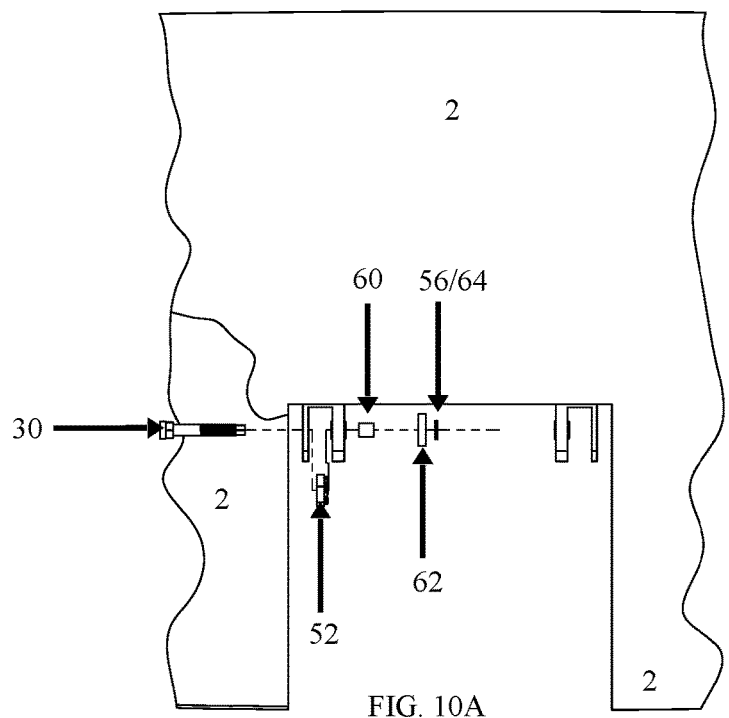
Figure 11:
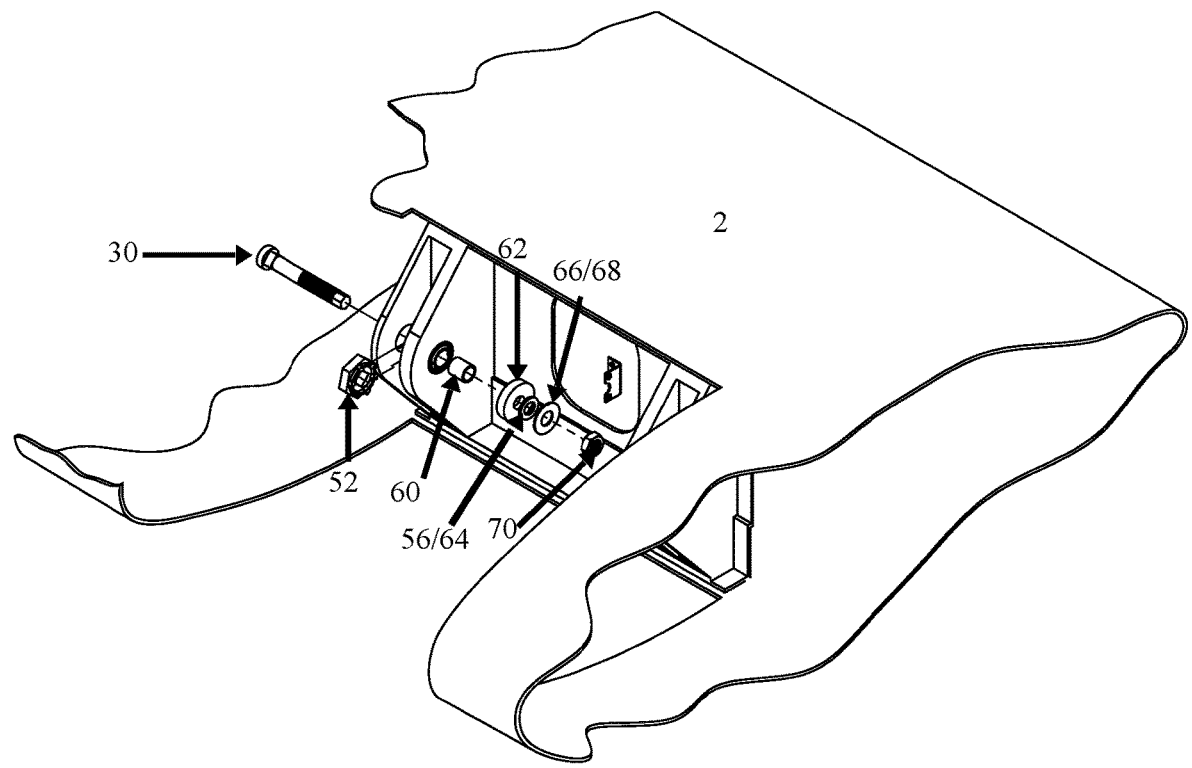
Figure 11A:
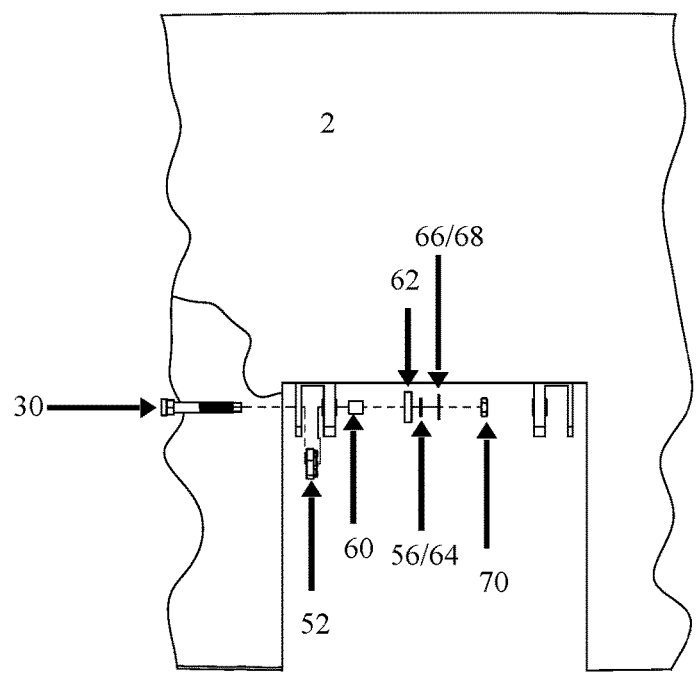
Figure 12:
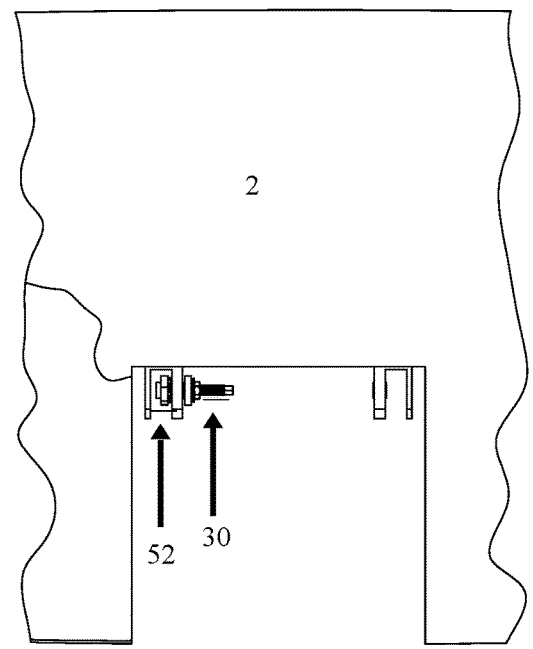
Figure 12A:
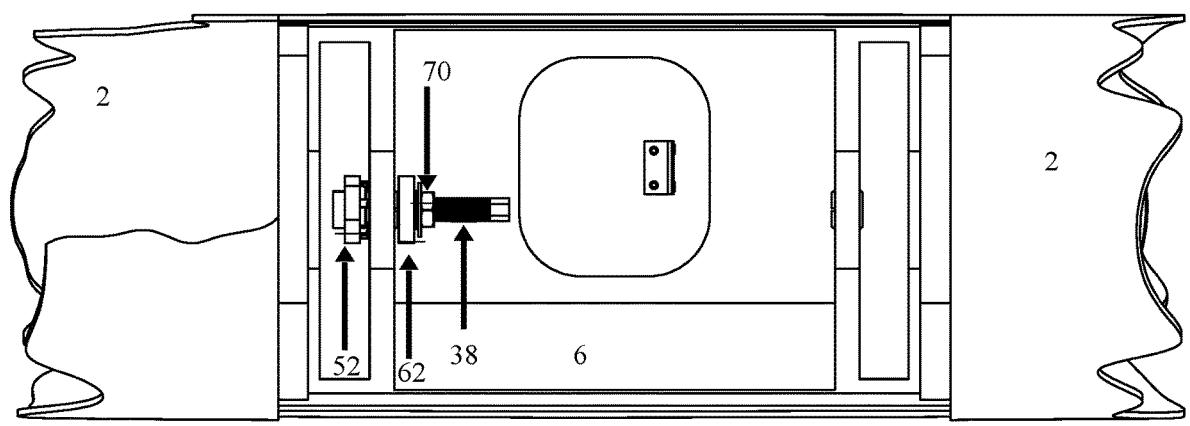
FIG. 12A depicts a side view of FIG. 12.

The first step in cutting the bearing is the insertion of inner bearing bushing 60 into the damaged bearing 1 (FIGS. 7 and 7A). Hexagonal cutting head 52 is positioned against damaged bearing 1 (FIGS. 8 and 8A). Cutting bolt 30 is positioned in the gap of outer stabilizer bracket 10 and inserted into hexagonal cutting head 52 and inner bearing bushing 60 (FIGS. 8 and 8A). Spacer cup 62 is positioned on the inner stabilizer bracket 8 opposite cutting bolt 30 and moved along cutting bolt 30 to damaged bearing 1 (FIGS. 9 and 9A). Thrust bearing spacer 64 is positioned inside thrust bearing bushing 56 and both are slide onto cutting bolt 30 until they are positioned next to spacer cup 62 (FIGS. 10 and 10A). The face of thrust bearing spacer 64 must be facing outward away from spacer cup 62 (FIGS. 10 and 10A). Flat washers 85 and 68 may positioned are positioned onto cutting bolt 30, and hex nut 70 is screwed onto cutting bolt 30 until snug (FIGS. 11 and 11A). A top view of the cutting stack assembly is shown in FIG. 12, and a front view of the cutting stack assembly is depicted in FIG. 12A.

A ratchet or wrench is then used to turn cutting bolt 30 tightening hex nut 70 onto cutting bolt 30 begins to cut damaged bearing 1 along the "V" groove formed by edges 20 and 22 (shown in FIGS. 3 and 4). Then the user makes 3 or 4 turns of the ratchet or wrench until the cutting surface of hexagonal cutting head 52 bottoms out. The user then removes the components from cutting bolt 30 and removes cutting bolt 30 from inner stabilizer bracket 8. Damaged bearing 1 may then be removed by a user pushing it out of housing lug 18.

Figure 13:
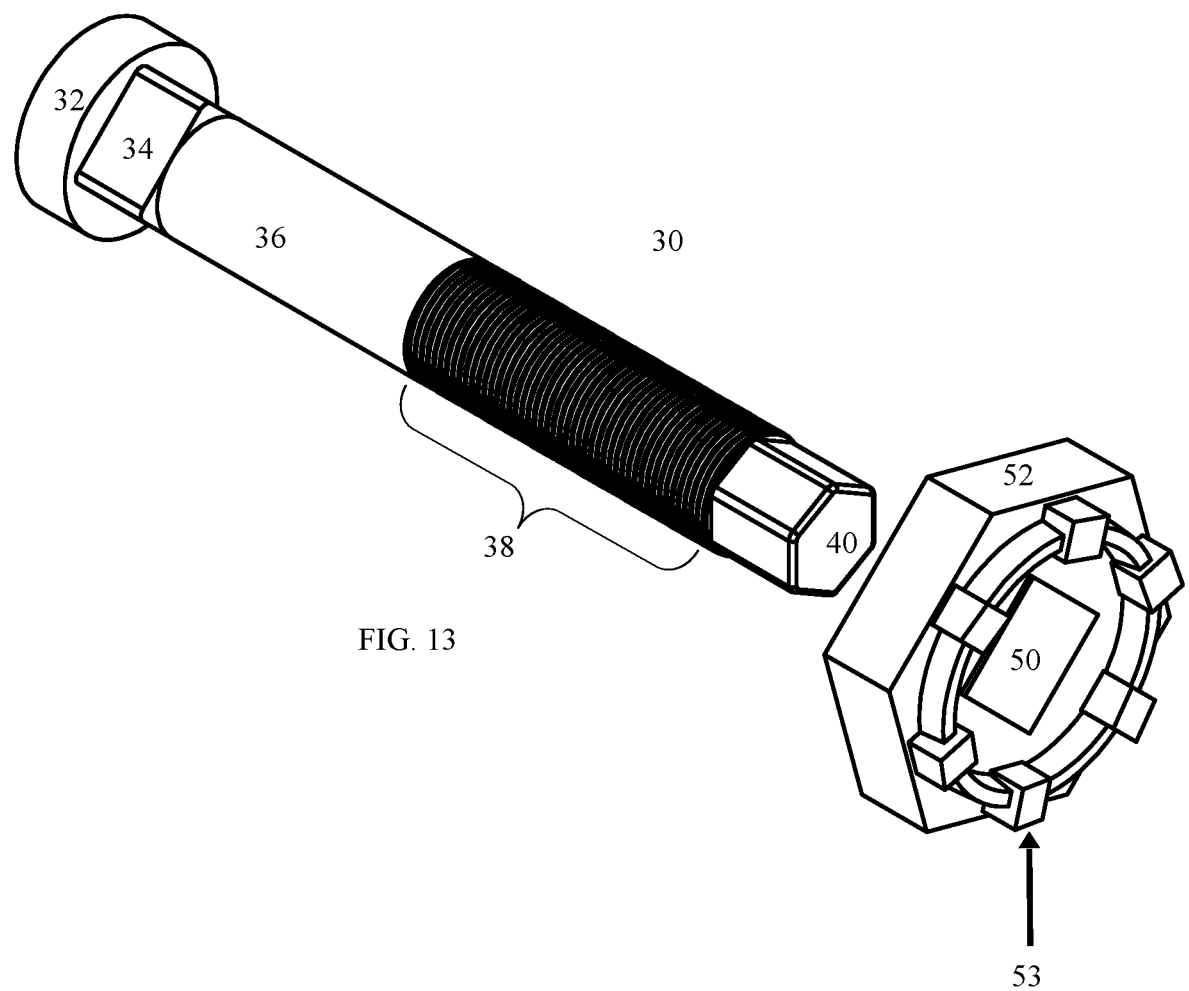
Figure 14:
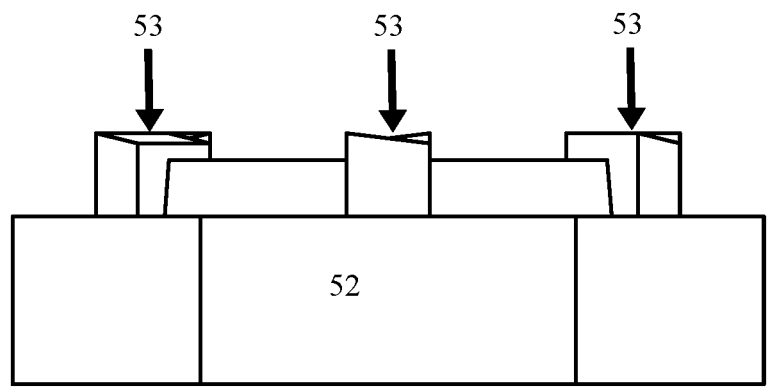

FIG. 13 depicts a side angled view of cutting bolt 30 and hexagonal cutting head 52. Note that cutting bolt 30 may comprise hexagon end 40 that traverses inner cavity 50 of hexagonal cutting head 52, threads 38 that are used to move hex nut 70 while cutting the "V" groove of damaged bearing 1. Shaft 36 is the correct length to allow all cutting stack assembly parts to be positioned onto cutting bolt 30. Bolt head 32 allows a user to position a ratchet or wrench onto cutting bolt 30, while square shaft 34 is formed to fit tightly within cavity 50 of hexagonal cutting head 52. Cutters 53 cut the "V" groove freeing damaged bearing 1 from housing lug 18. FIG. 14 illustrates a side view of hexagonal cutting head 52. Note cutters 53 are sharp and angled to cut the "V" groove.

Figure 15:
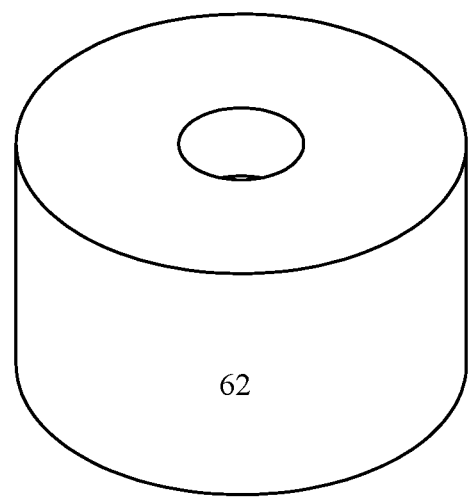
Figure 16:
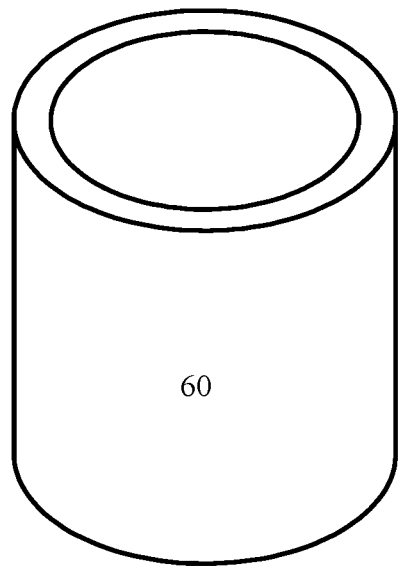
Figure 17:
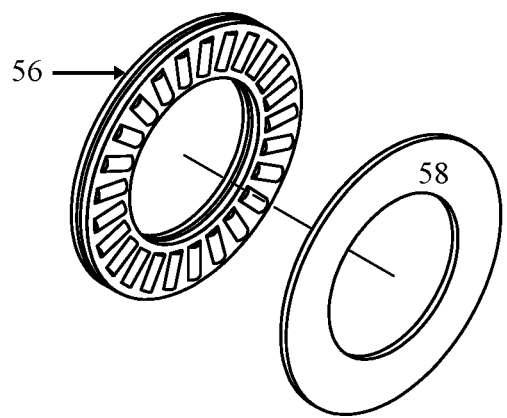
Figure 18:
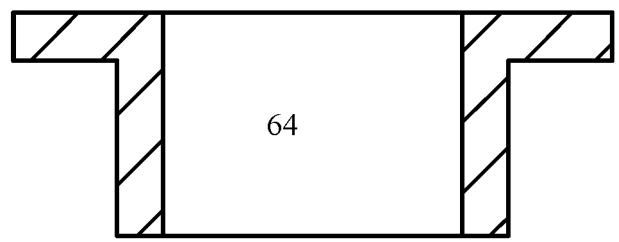

FIG. 15 shows spacer cup 62, FIG. 16 depicts inner bearing bushing 60, and FIG. 17 depicts thrust bushing 56 and washer 58. FIG. 18 illustrates a mid-sectional view of the thrust bearing space 64. All of the parts of the kit include cutting stack assembly components specially sized for the Apache Echo mode.

Figure 19:
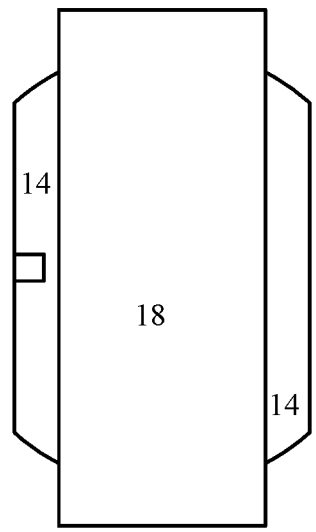
Figure 19A:
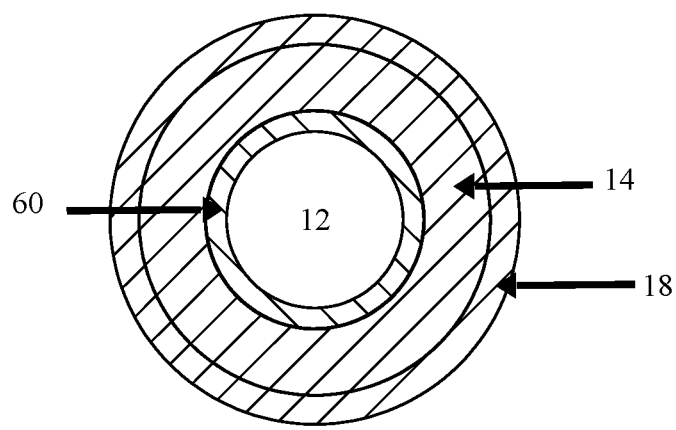

FIG. 19 illustrates a exterior side view of damaged bearing 1. FIG. 19A depicts a mid-sectional view of inner bearing bushing 60 positioned within the ball 14 damaged bearing 1, which is positioned within bearing housing lug 18.

FIGS. 20 through 27 depict the bearing removal stack for the Delta model of the Apache helicopter. FIG. 20 depicts a top view of the stabilizer with the cutting stack assembly components exploded, while FIG. 21 depicts a mid-sectional view of the assembled cutting stack assembly.

The removal Delta cutting stack assembly includes: bolt 31, bearing plunger 82, inner bearing bushing 60, spacer cup 62, thrust bearing bushing 56, flat washer 58, and hex nut 70. FIG. 22 illustrates the Delta cutting stack assembly components exploded, while FIG. 22A depicts a top view of FIG. 22.

A user may first place inner bearing bushing 60 into damaged bearing 1. Bearing plunger 80 may be held by the user while cutting bolt 31 is inserted into damaged bearing 1. Bearing plunger 80 should be positioned between the head of cutting bolt 31 and inner stabilizer bracket 8. Cutting bolt 31 is aligned through bearing plunger 80 from the access area 4 of the Delta stabilizer, and through damaged bearing 1. Spacer cup 62, which may be smaller for the Delta cutting stack assembly, may be positioned against damaged bearing 1 opposite bearing plunger 80. Thrust bearing bushing 56 and washer 58 may be placed upon cutting bolt 31 and half hex nut 70 screwed onto cutting bolt 31 by hand until tight. FIG. 23 depicts the Delta cutting stack assembly with half hex nut 70 hand tightened. Using a ratchet or wrench, a user tightens cutting bolt 31 until damaged bearing 1 is cut along the "V" groove, freeing damaged bearing 1 from bearing housing lug 18.

The user continues to tighten cutting bolt 31 until damaged bearing 1 slides into spacer cup 62. Once the cutting bolt is flush with inner stabilizer bracket 8, the user may position yoke 82 between bearing plunger 80 and cutting bolt 31 to provide additional space to further tighten cutting bolt 31, causing damaged bearing 1 to move further inside spacer cup 62. A user repeats the tightening procedure until bearing 1 falls free into spacer cup 62. The Delta cutting stack assembly may then be removed from the stabilizer.

Cutting bolt 31 is illustrated in FIG. 25. Threads 38 are utilized to screw hex nut 70 onto the bolt. The length of shaft 36 may be customized for the Delta model. Bearing plunger 80 is formed with a hole to accept shaft 36. Bearing plunger 80 is formed to make contact with housing lug 18 to push housing lug 18 out of inner stabilizer bracket 8. Yoke 82 is illustrated in FIG. 27. Yoke 82 is formed to be positioned along shaft 36 to provide additional space while cutting bolt 31 is being tightened inside access area 4.

FIGS. 28 through 34A show the outboard staking assembly wherein a new, unused replacement bearing 15 is staking, creating a new "V" groove onto the outer surface of where the replacement bearing 15 contacts housing lug 18. The outboard staking case is used for both Delta and Echo models.

Figure 28:
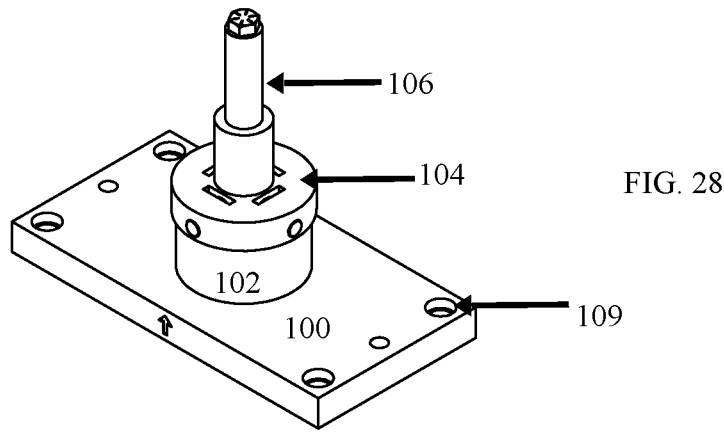
Figure 28A:
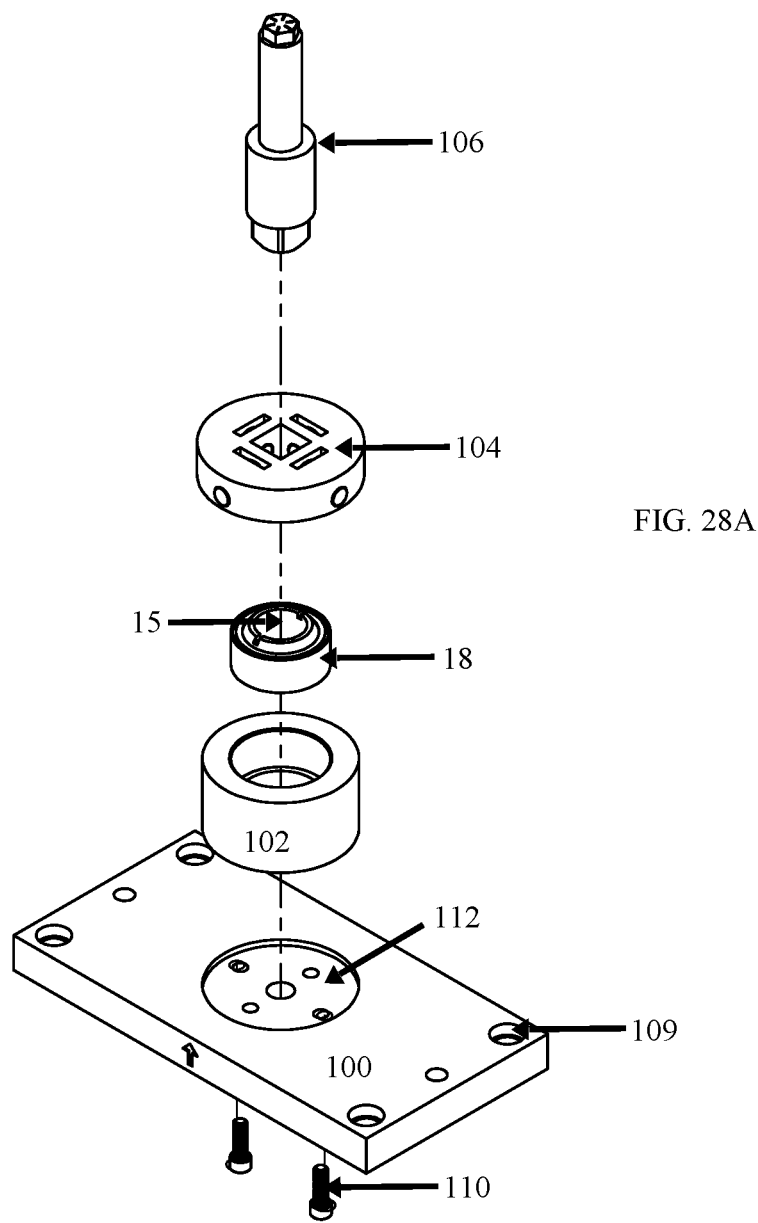
Figure 29:
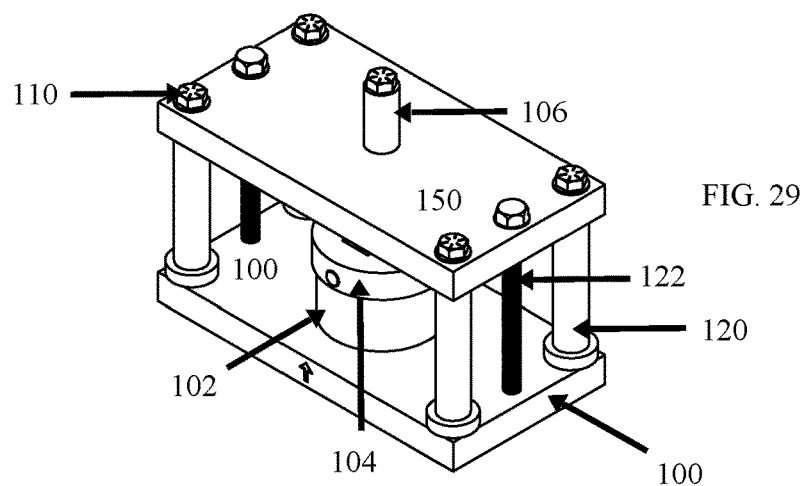

FIG. 28 depicts the bottom and middle components of the staking assembly, while FIG. 29 is an exploded view of the bottom and middle components of the staking assembly. Components depicted include: bottom plate 100, top plate 150, threaded bolts 122, screws 110, screw openings 109, staking shaft 106, staking head 104, new retainer cup 102, replacement bearing 15, bearing housing lug 18, corner pins 120, staking plate cup holder 112, 2-prong removal tool 130 with prongs 132.

Staking head 104 comprises a staking anvil wherein the staking surface is formed to create a "V" groove out of edges 20 and 22 when a user rotates staking head 104 about edges 20 and 22 while applying sufficient force. Staking head 104 is cut around the face of the outer race of replacement bearing 15 and edges 20 and 22.

Figure 29A:
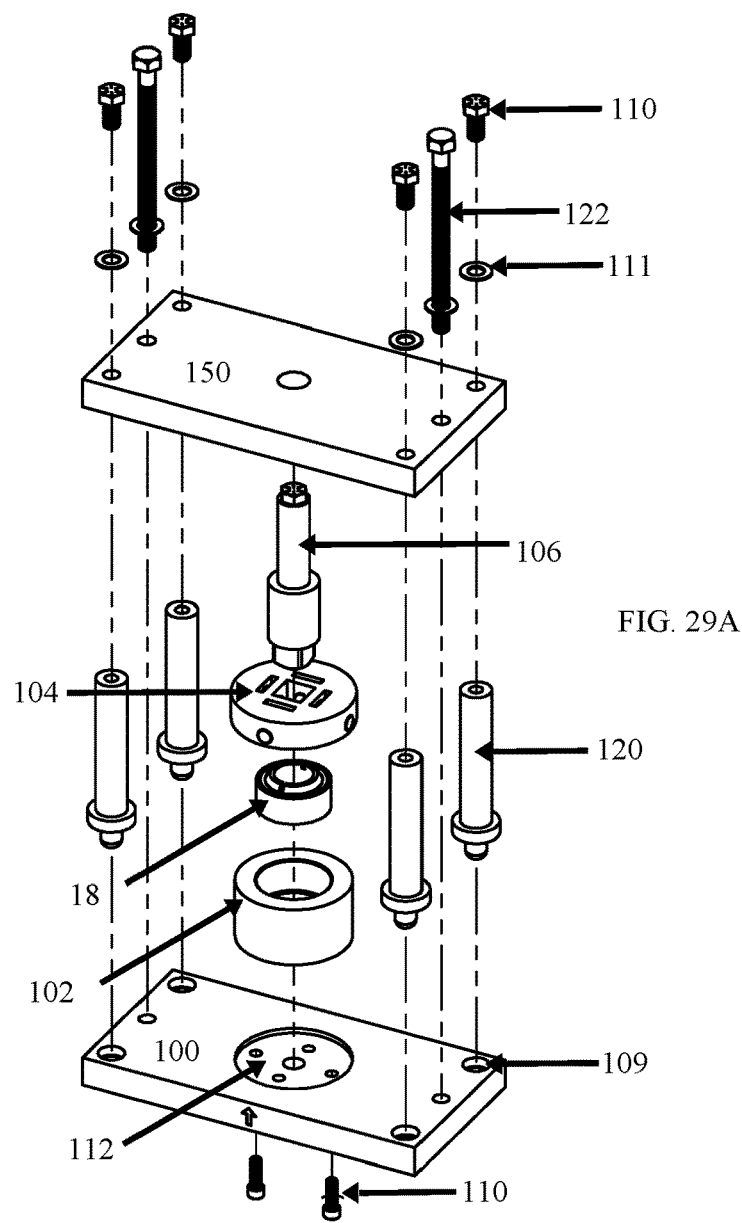

FIG. 29 illustrates the complete staking assembly, while FIG. 29A depicts FIG. 29 with the components exploded. Replacement bearing 1 is positioned within bearing housing lug 18. Replacement bearing 1 is then positioned within bearing retainer cup 102 so that the torque slots are facing up toward staking head 104. Staking head 104 is placed on replacement bearing 1 and staking shaft 106 is positioned onto of staking head 104 and into the formed slot on staking head 104. Top plate 150 is positioned on top of staking shaft 106 and corner pins 120, threaded bolts 122, screws 110 and washers 111 should be seated and secured onto top plate 150. A user with a ratchet may then turn staking shaft 106 until staking head 106 moves freely. Threaded bolts 122 may be tightened slightly and the staking shaft 106 turned 3 times creating the "V" groove formed from edges 20 and 22, as shown in FIG. 32B, securing replacement bearing 15 into housing lug 18.

Figure 30:
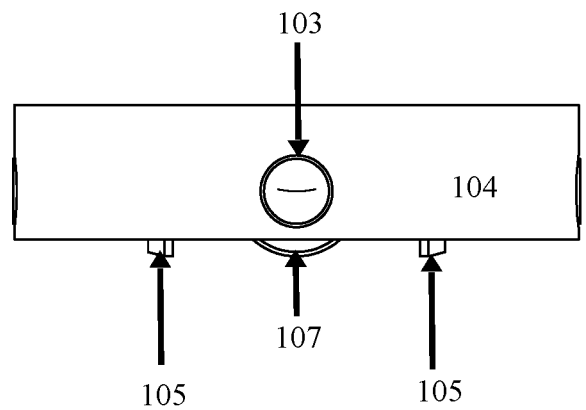
Figures 31, 31A:
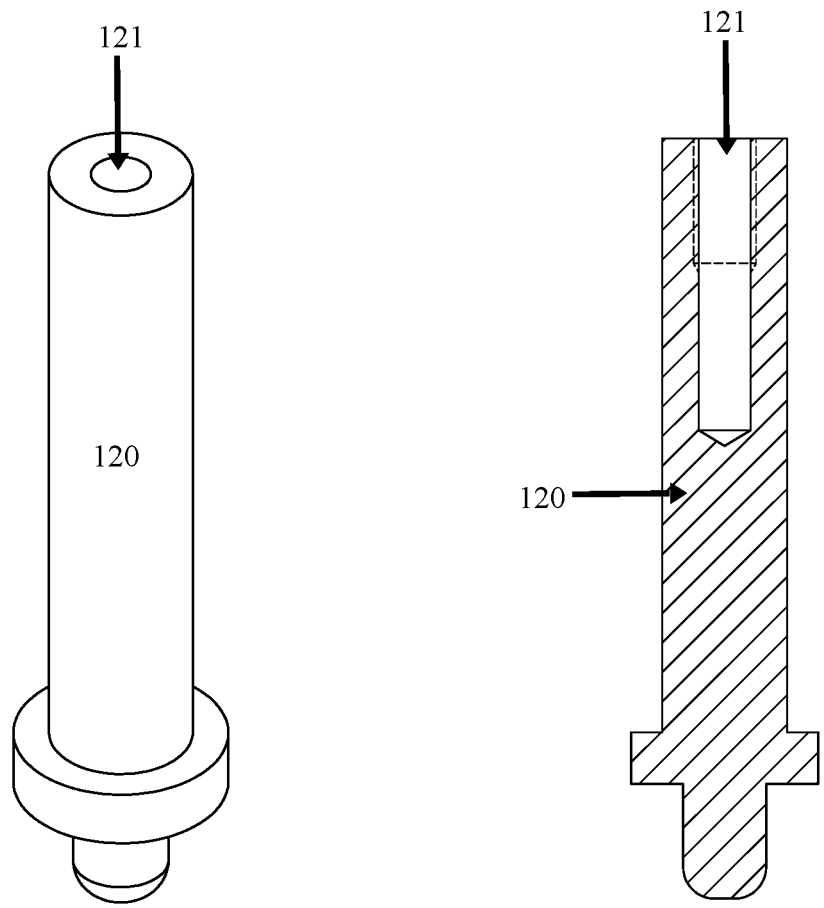

Note on FIG. 30, staking head 104 includes cutting blades 107, rollers 105, and roller axle 103. FIG. 31 depicts an angled front view of corner pin 120, and FIG. 31A depicts a mid-sectional view of corner pin 120. Corner pin 120 may include cavity 121 to accept screws 110.

Figure 32:
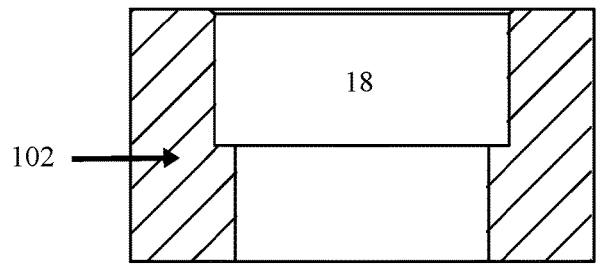

A mid-sectional view of bearing retainer cup 102 is shown in FIG. 32. Bearing retainer cup 102 is depicted with housing lug 18 positioned so that replacement bearing 15 may be staked.

Figure 32A:
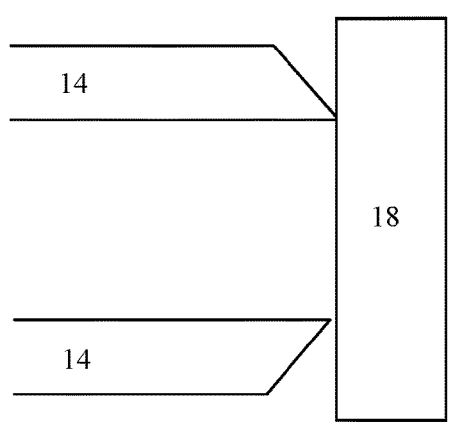
Figure 32B:
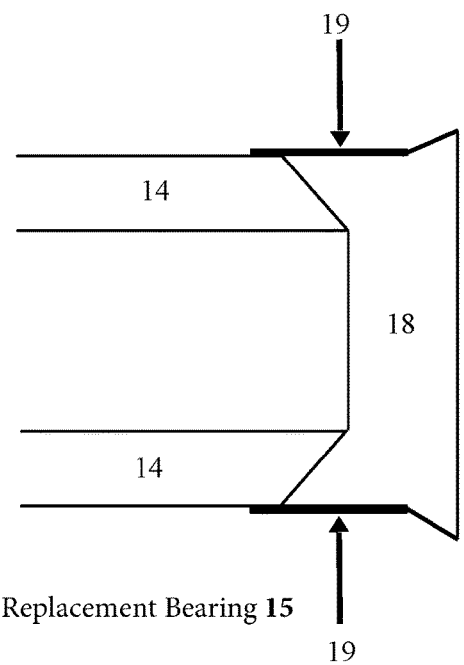
Figure 32C:
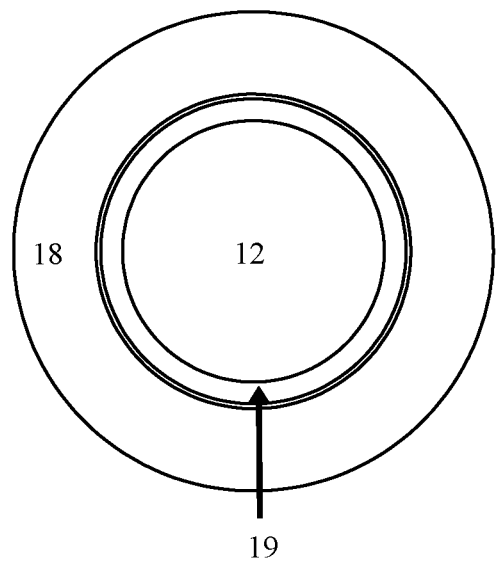
Figure 32D:
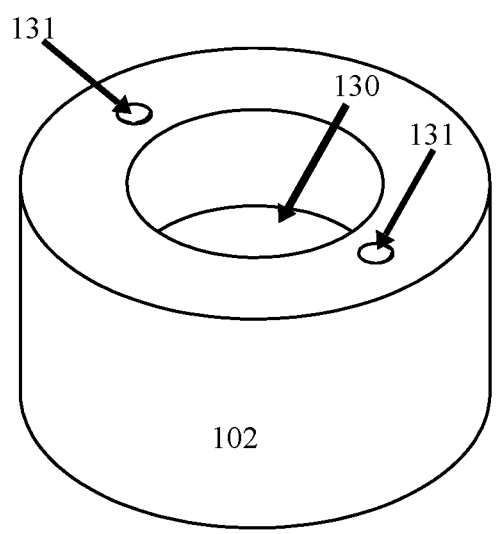
Figure 33:
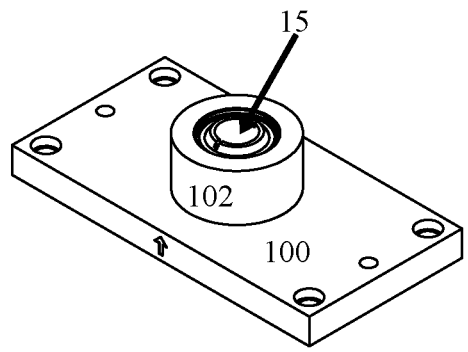
Figure 34:
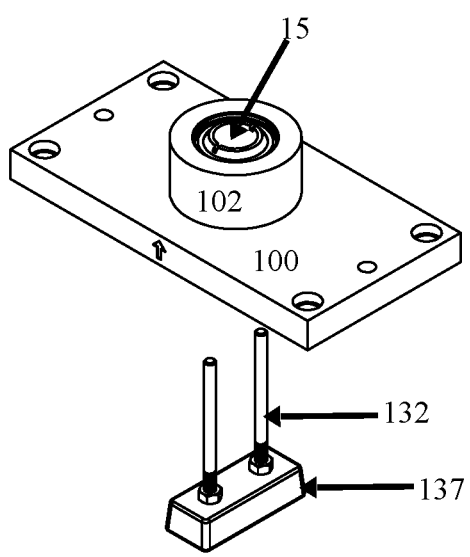
Figure 34A:
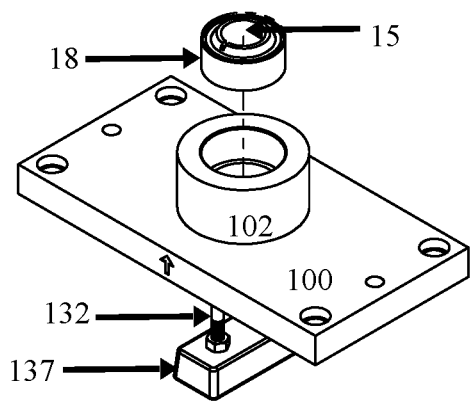
Figure 35:
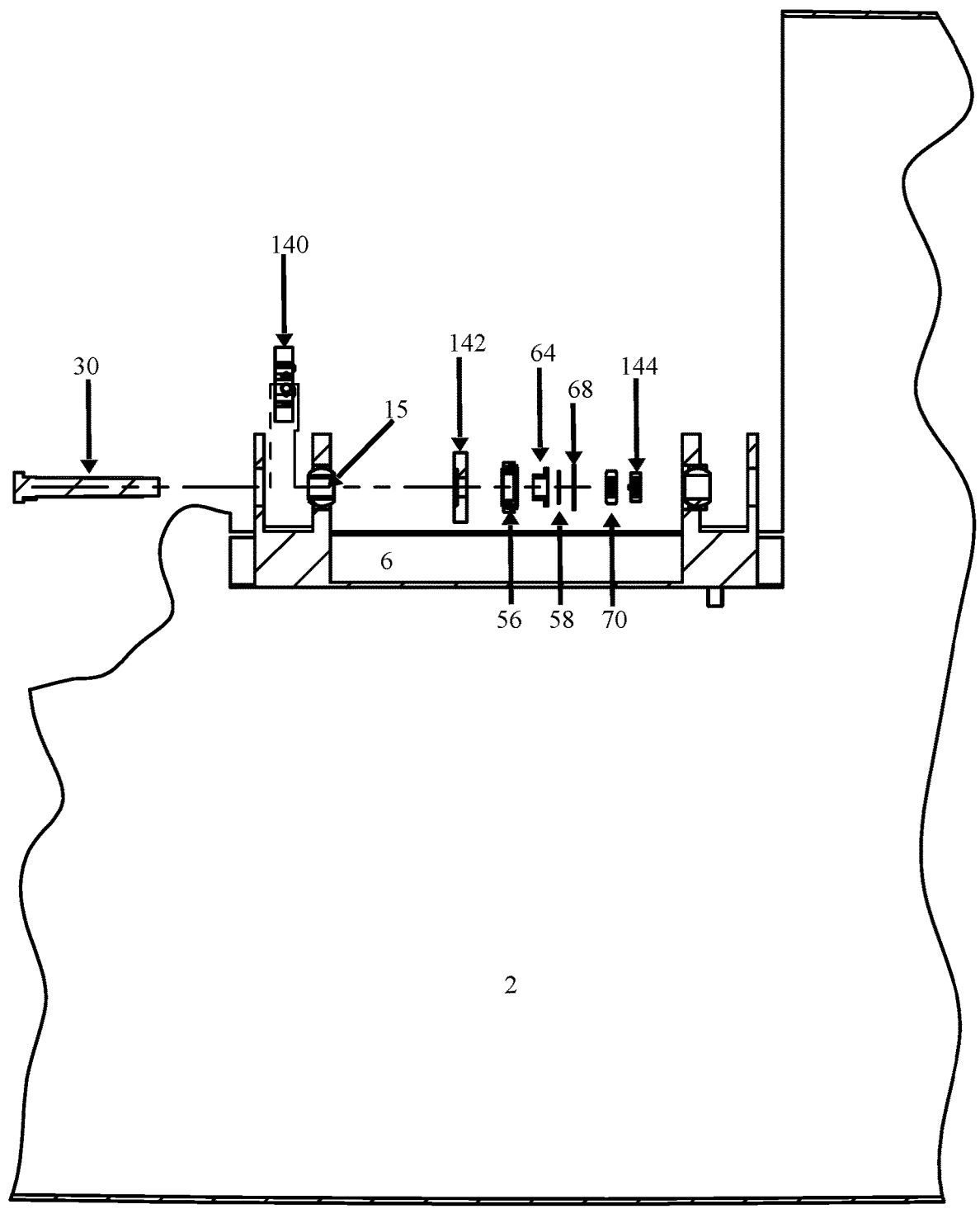
Figure 36:
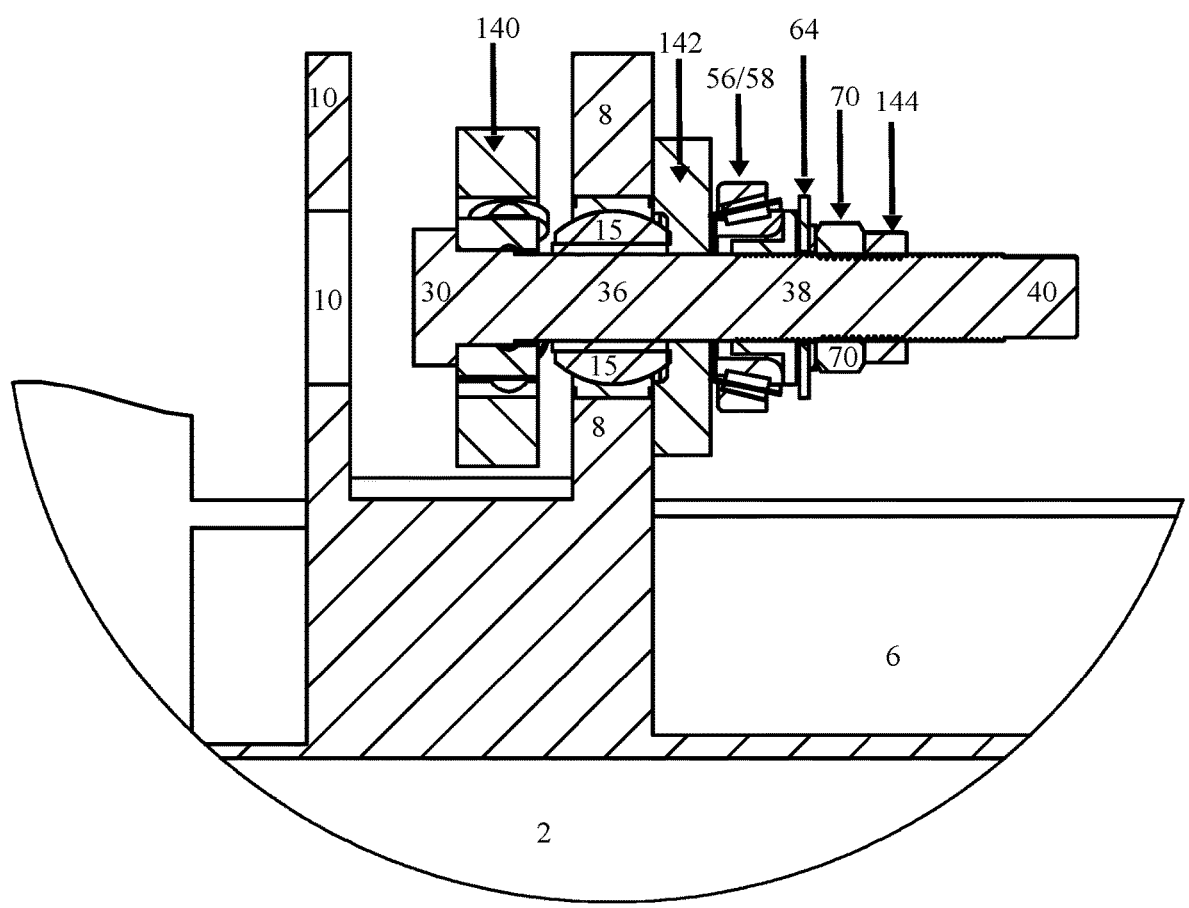
Figure 37:
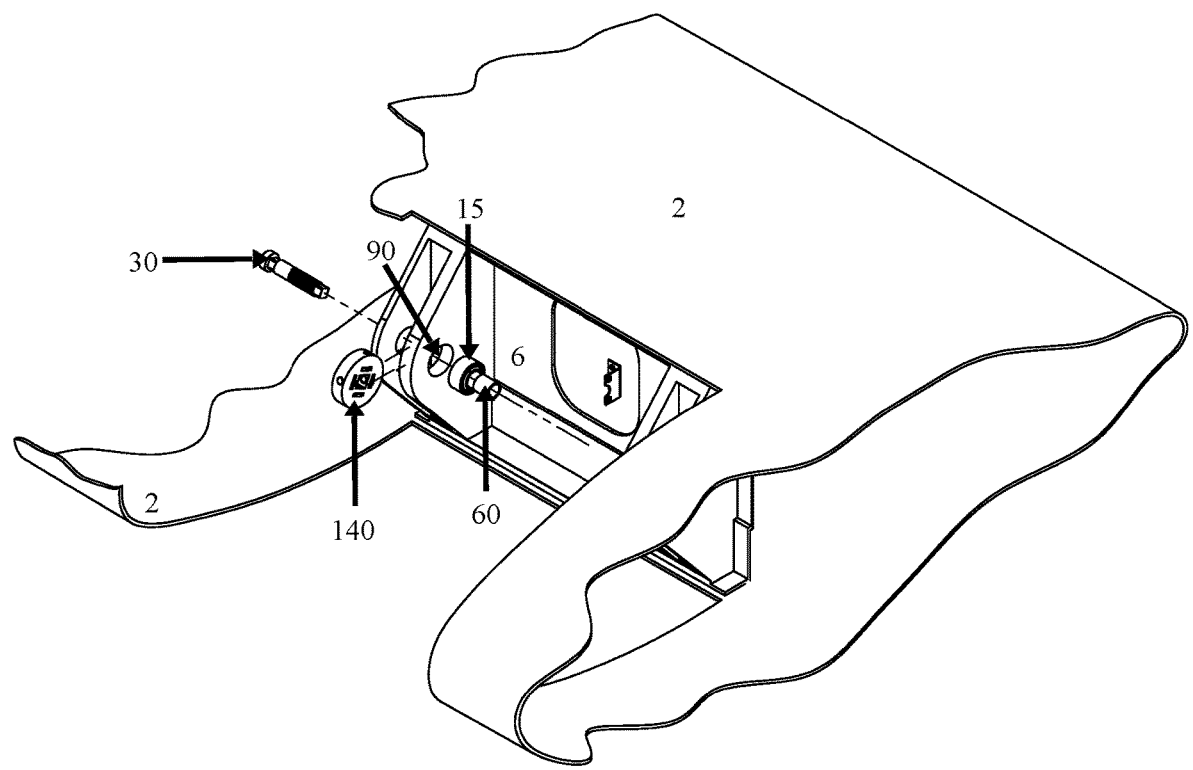
Figure 37A:
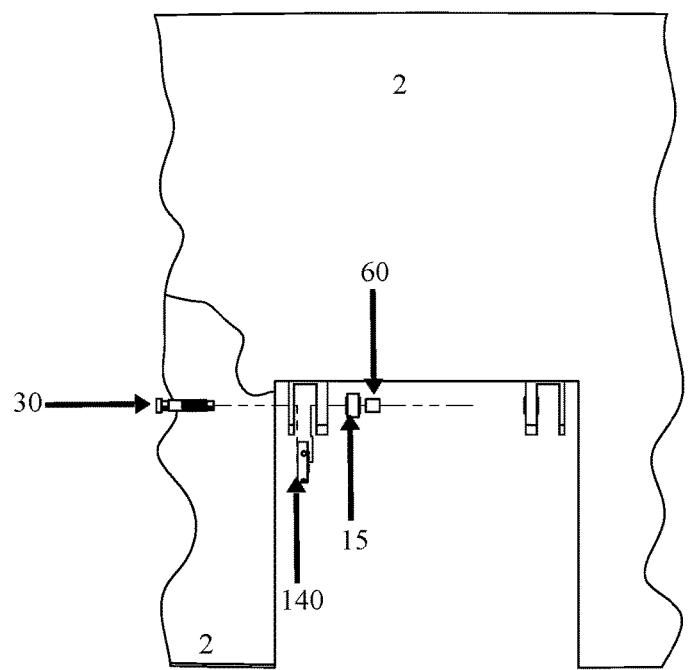
Figure 38:
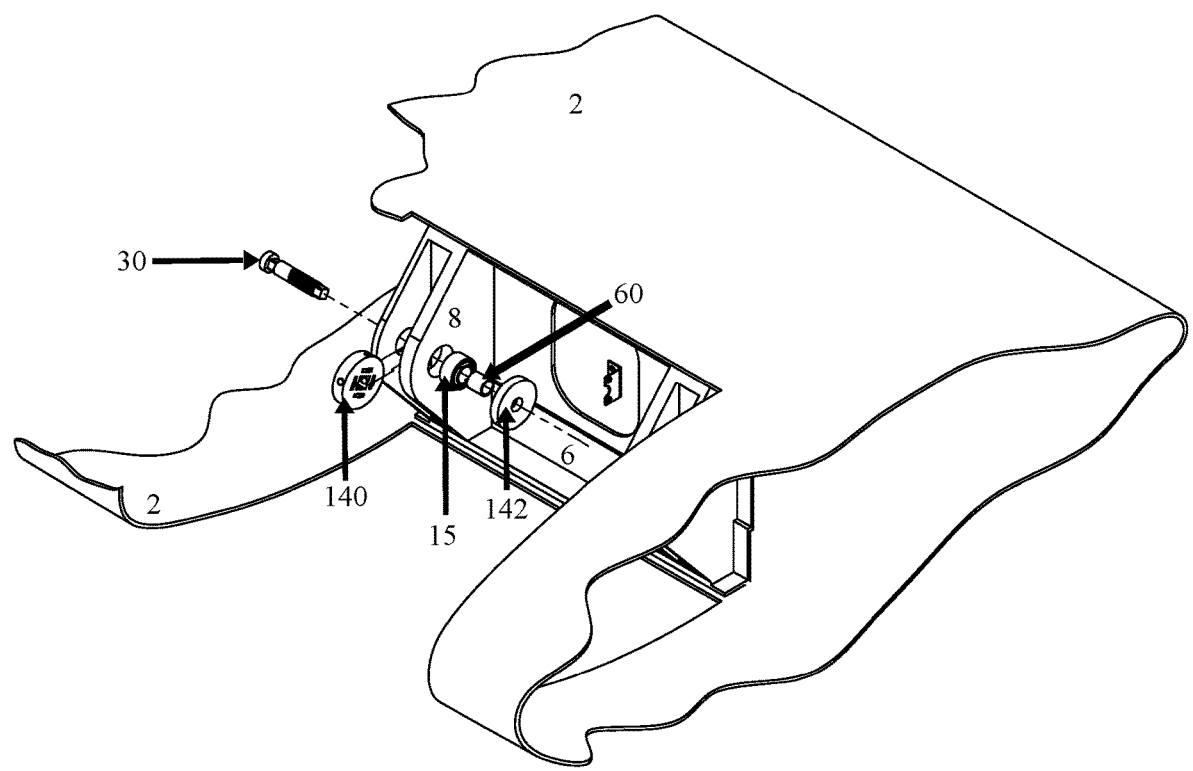
Figure 38A:
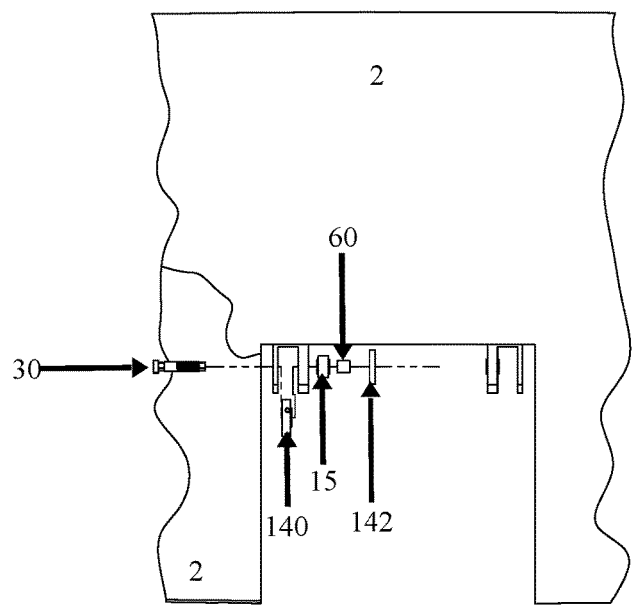
Figure 39:
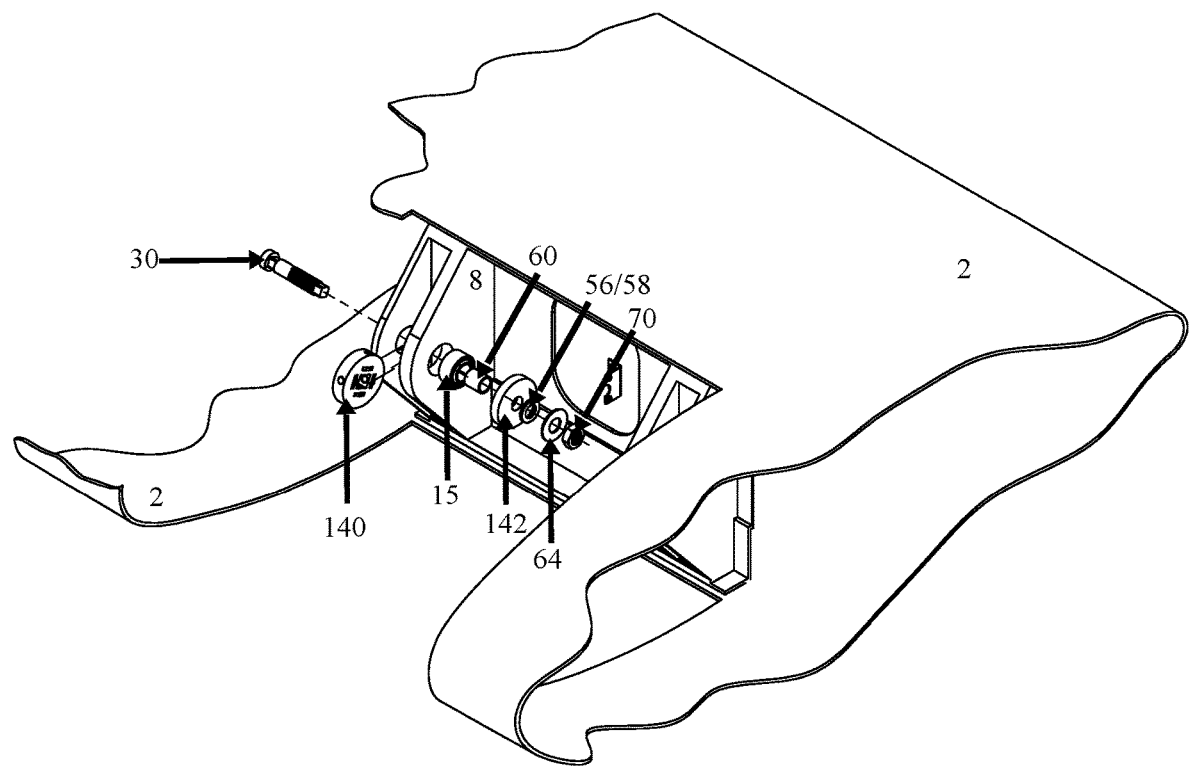
Figure 39A:
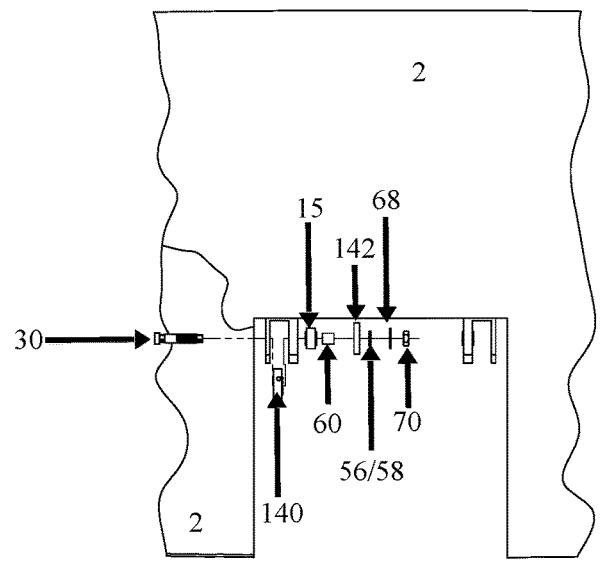

Replacement bearing 15 prior to staking is shown in FIG. 32A. Bearing housing lug 18 contacts the edges of ball 14. FIG. 32B depicts replacement bearing 1 upon staking with the staking assembly herein. Note edge "V" groove 19 is formed joining ball 14 of replacement bearing 15 with housing lug 18. "V" groove 19 is shown in FIG. 32C. Bearing retainer cup 102 is shown in FIG. 32D. Note that bearing retainer cup 102 may include cavity 130 that holds replacement bearing 15 and one or more hole 131 that may be used to remove replacement bearing 15 from bearing retainer cup 102.

Replacement bearing 15 and housing lug 18 may be removed from bearing retainer cup 102 using 2-prong removal tool 137 with prongs 132. The prongs of 2-prong removal tool 137 may be inserted into one or more hole 131 to remove staked replacement bearing 15 from bearing retainer cup 102.

Bearing installation in Echo models is shown in FIGS. 35 through 40A. The bearing installation assembly for the Echo model includes: hexagonal bolt 30 with a hexagonal head, large flat spacer 142, thrust bearing bushing 56, thrust bearing spacer 64, flat washers 85 and 68, and hex nut 70.

FIGS. 37 through 40A include staking head 140, which is positioned between cutting bolt 30 and replacement bearing 15. "V" groove 90 is created during installation of replacement bearing 15 by the movement of replacement bearing 15 against staking head 140. This inclusion of staking head 140 in the installation assembly should only occur if replacement bearing 15 has not previously been staked. Staking replacement bearing 15 during installation would reduce the number of necessary components and would reduce the time expended during replacement of damaged bearing 1. Staking during installation may facilitate replacement of helicopter bearings in the field.

Replacement bearing 15 is shown installed in stabilizer brackets 10 and 8. Hexagonal bolt 30 is inserted through staking head 140, large flat spacer 142, thrust bearing bushing 56, thrust bearing spacer 64, flat washers 85 and 68, and hex nut 70. Using a ratchet or wrench, a user turns cutting bolt 30 to tighten the stacking installation assembly and to stake replacement bearing 15 (when staking head 140 is included in the installation assembly). A user then removes cutting bolt 30 and the other components of the installation assembly.

Bearing installation in the Apache Delta model is shown in FIGS. 41 through 47A. The bearing installation assembly for the Delta model includes: bolt 31, large flat spacer 142, inner bearing bushing 60, small flat spacer 150, thrust bearing bushing 56, flat washers 58 and 68, and hex nut 70. A user inserts the bearing installation assembly for the Delta model into brackets 8 and 10 as shown, and tights bolt 31 pushing new bearing 15 and housing lug 18 into bracket 8. Then, the user removes bolt 31 and the other components of the installation assembly.

The Delta installation assembly could alternately include staking head 140 if replacement bearing 15 has not been staked prior to installation in the stabilizer. If replacement bearing 15 is to be staked during installation, then large flat spacer 142 would be replaced with staking head 140. Staking head 140 comprises a staking anvil wherein the staking surface is formed to create a "V" groove out of edges 20 and 22 when a user rotates staking head 140 about edges 20 and 22 while applying sufficient force. The "V" groove is formed when cutting blades 107 (shown in FIG. 30) and rollers 105 (shown in FIG. 30) move about the outer race of replacement bearing 15. Staking head 140 is cut around the face of the race of replacement bearing 15 and edges 20 and 22. Staking head 140 is specifically sized and formed so that it may be positioned between replacement bearing 15 and cutting bolt 30 and cutting bolt 31. This staking method may be employed with both Apache Echo and Delta models.

FIGS. 48 through 50 show replacement bearing 15 and housing lug 18 properly installed in an Apache Delta model helicopter stabilizer. The stabilizer is now ready to be re-installed onto the helicopter.

I hereby claim:

1. A kit for replacing an aileron bearing in an aircraft stabilizer comprising:
    a removal assembly, wherein the removal assembly comprises:
        a bolt, wherein the bolt has sufficient length to traverse the aileron bearing and all components of the removal assembly when inserted into the aileron bearing,
        a cutting means, wherein the cutting means cuts the aileron bearing when rotated against the surface of the aileron bearing,
        a bearing bushing that is inserted into a ball of the aileron bearing,
        a spacer cup that catches the aileron bearing while the aileron bearing is being removed from the aircraft stabilizer,
        a hex nut, wherein the hex not is formed to screw onto the bolt, wherein tightening of the bolt into the hex nut causes the cutting means to rotate cutting the aileron bearing,
    a staking means, wherein the staking means comprises a staking anvil, wherein the staking means includes a cutting means to cut the edges so that a "V" groove is formed between an outer race of the aileron bearing and the edges of a housing that houses the aileron bearing,
    an installation assembly, wherein the installation assembly comprises:
        an installation bolt, wherein the installation bolt has sufficient length to traverse a replacement aileron bearing and all components of the installation assembly when inserted into the replacement aileron bearing, and
        an installation hex nut, wherein the installation hex nut is formed to screw onto the installation bolt, wherein tightening of the installation bolt into the installation hex nut causes the replacement aileron bearing to be positioned into the aircraft.

2. The device of claim 1, wherein the staking means is positioned between the installation bolt and the replacement bushing, wherein tightening of the installation bolt causes the staking means to rotate relative to the replacement bushing.

3. The device of claim 1, wherein the staking means comprises:
    a top plate coupled to a bottom plate by two or more pins,
    a retainer cup to hold the replacement bearing during staking, wherein the staking cup is coupled to the bottom plate,
    a staking head that stakes the replacement bearing, and
    a staking shaft that couples to the top plate, wherein the staking shaft couples to the staking head, wherein rotation of the staking shaft causes the staking head to rotate staking the replacement bearing.

4. The device of claim 3, further comprising a removal tool, wherein the removal tool comprises one or more prongs that eject the replacement bearing from the retainer cup when the one or more prongs is pushed against the replacement bearing.

5. The device of claim 1, further comprising a bearing plunger that is positioned between the bolt and the aileron bearing, wherein the bearing plunger pushes against a housing of the aileron bearing when the bolt is tightened into the hex nut.

6. The device of claim 5, further comprising a spacer that is positioned between the bearing plunger and the bolt.

7. The device of claim 1, wherein the aircraft is an Apache helicopter.

8. A removal assembly for removing an aileron bearing from an Apache helicopter stabilizer comprising:
    a bolt, wherein the bolt has sufficient length to traverse the aileron bearing and all components of the removal assembly when inserted into the aileron bearing,
    a cutting means, wherein the cutting means cuts the aileron bearing when rotated against the surface of the aileron bearing,
    a bearing bushing that is inserted into a ball of the aileron bearing, a hex nut, wherein the hex not is formed to screw onto the bolt, wherein tightening of the bolt into the hex nut causes the cutting means to rotate cutting the aileron bearing, and a spacer cup that catches the aileron bearing while the bolt is being tightened.

9. An staking and installation assembly for staking and installing an aileron bearing into an Apache helicopter stabilizer comprising:

a staking means, wherein the staking means comprises a staking anvil, wherein the staking means includes a cutting means to cut the edges so that a "V" groove is formed between an outer race of the aileron bearing and the edges of a housing that houses the aileron bearing, an installation assembly, wherein the installation assembly comprises:

an installation bolt, wherein the installation bolt has sufficient length to traverse a replacement aileron bearing and all components of the installation assembly when inserted into the replacement aileron bearing, and an installation hex nut, wherein the installation hex nut is formed to screw onto the installation bolt, wherein tightening of the installation bolt into the installation hex nut causes the replacement aileron bearing to be positioned into the aircraft.

10. The device of claim 9, wherein the staking means is positioned between the installation bolt and the replacement bushing, wherein tightening of the installation bolt causes the staking means to rotate relative to the replacement bushing.

* * * * *